United States Patent
Ishii et al.

(10) Patent No.: US 12,027,062 B2
(45) Date of Patent: Jul. 2, 2024

(54) COMMUNICATION SKILL EVALUATION SYSTEM, COMMUNICATION SKILL EVALUATION DEVICE AND COMMUNICATION SKILL EVALUATION METHOD

(71) Applicant: NIPPON TELEGRAPH AND TELEPHONE CORPORATION, Tokyo (JP)

(72) Inventors: Ryo Ishii, Yokosuka (JP); Ryuichiro Higashinaka, Yokosuka (JP); Junji Tomita, Yokosuka (JP); Shiro Kumano, Yokosuka (JP); Kazuhiro Otsuka, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 161 days.

(21) Appl. No.: 16/762,894

(22) PCT Filed: Nov. 7, 2018

(86) PCT No.: PCT/JP2018/041398
§ 371 (c)(1),
(2) Date: May 8, 2020

(87) PCT Pub. No.: WO2019/093392
PCT Pub. Date: May 16, 2019

(65) Prior Publication Data
US 2021/0174702 A1 Jun. 10, 2021

(30) Foreign Application Priority Data
Nov. 10, 2017 (JP) ................... 2017-217186

(51) Int. Cl.
*G09B 19/04* (2006.01)
*G10L 15/02* (2006.01)
*G10L 17/22* (2013.01)

(52) U.S. Cl.
CPC ............. *G09B 19/04* (2013.01); *G10L 15/02* (2013.01); *G10L 17/22* (2013.01)

(58) Field of Classification Search
CPC ......... G09B 19/04; G10L 15/02; G10L 17/22; G10L 25/48
See application file for complete search history.

(56) References Cited

U.S. PATENT DOCUMENTS 6,894,714 B2 * 5/2005 Gutta ....................... H04N 7/15
348/E7.083
9,443,521 B1 * 9/2016 Olguin Olguin ....... G10L 17/00
(Continued)

FOREIGN PATENT DOCUMENTS

| JP | 2005227584 A | 8/2005 |
| JP | 2010536053 A | 11/2010 |

(Continued)

OTHER PUBLICATIONS

Ishii, R., Kumano, S., & Otsuka, K. (Oct. 31, 2016). Analyzing mouth-opening transition pattern for predicting next speaker in multi-party meetings. In proceedings of the 18th ACM international conference on multimodal interaction (pp. 209-216), https://doi.org/10.1145/2993148.2993189 (Year: 2016).*

(Continued)

*Primary Examiner* — Bhavesh M Mehta
*Assistant Examiner* — Nandini Subramani
(74) *Attorney, Agent, or Firm* — Harness, Dickey & Pierce, P.L.C.

(57) ABSTRACT

A communication skill evaluation system including: an audio input device; a measurement device; an utterance (Continued)

period detection unit that, based on the audio information input by the audio input device, detects an utterance period and a participant who spoke in each utterance period; a participatory role assignment unit that assigns a participatory role to each participant in accordance with whether or not each participant spoke in each utterance pair composed of two utterances obtained in chronological order from each utterance period; a feature quantity extraction unit that, based on the measurement results by the measurement device, extracts a non-verbal feature quantity for each participant, relating to the non-verbal action at the end of the utterance in each utterance period; and an estimation unit that estimates communication skill for each participant based on a combination, in each utterance period, of the participatory role and the non-verbal feature quantity.

16 Claims, 9 Drawing Sheets

(56) References Cited

U.S. PATENT DOCUMENTS

| | | | | |
|---|---|---|---|---|
| 2010/0253689 | A1* | 10/2010 | Dinicola | H04M 3/567 |
| | | | | 382/190 |
| 2014/0081637 | A1* | 3/2014 | Wren | G10L 19/018 |
| | | | | 704/246 |
| 2014/0297277 | A1 | 10/2014 | Zechner et al. | |
| 2016/0189562 | A1 | 6/2016 | Vaughan et al. | |
| 2016/0275952 | A1* | 9/2016 | Kashtan | G10L 17/00 |
| 2021/0035600 | A1* | 2/2021 | Ishii | G06F 18/2411 |

FOREIGN PATENT DOCUMENTS

| | | | |
|---|---|---|---|
| JP | 2014222399 | A | 11/2014 |
| JP | 2014238525 | A | 12/2014 |
| JP | 2015045915 | A | 3/2015 |
| JP | 2016111426 | A | 6/2016 |
| JP | 2017116716 | A | 6/2017 |
| JP | 2017117161 | A | 6/2017 |
| JP | 2018004813 | A | 1/2018 |
| WO | WO-2009007011 | A1 | 1/2009 |

OTHER PUBLICATIONS

Ryo Ishii, et.el . . . 2016. Analyzing mouth-opening transition pattern for predicting next speaker in multi-party meetings. In Proceedings of the 18th ACM International Conference on Multimodal Interaction (ICMI '16), 209-216 (Year: 2016).*

Ryo Ishii, Kazuhiro Otsuka, Shiro Kumano, and Junji Yamato. 2016. Prediction of Who Will Be the Next Speaker and When Using Gaze Behavior in Multiparty Meetings. ACM Trans. Interact. Intell. Syst. 6, 1, Article 4 (May 2016), (Year: 2016).*

R. Ishii, et. al. Predicting next speaker using head movement in multi-party meetings. In Proc. ICASSP, pp. 2319-2323, 2015 (Year: 2015).*

Mark H. Davis, "A Multidimensional Approach to Individual Differences in Empathy", JSAS Catalog of Selected Documents in Psychology, vol. 10, (85)1980 (19 pages).

Mark H. Davis, "Measuring Individual Differences in Empathy: Evidence for a Multidimensional Approach", Journal of Personality and Social Psychology, vol. 44 (1), 1983 pp. 113-126.

Ryuichiro Higashinaka et al., "Towards an open-domain conversational system fully based on natural language processing", In Proceedings of 25th International Conference on Computational Linguistics, (2014) pp. 928-939.

Takeshi Fuchi et al., "Japanese Morphological Analyzer using Word Co-occurrence—Jtaj-", In Proceedings of International Conference on Compational Linguistics, p. 209-413 (1998).

J. R. Quinlan, "Improved Use of Continuous Attributes in C4.5"; Journal of Artificial Intelligence Research 4 (1996) pp. 77-90.

Toyomi Meguro et al., "Controlling Listening-oriented Dialogue using Partially Observable Markov Decision Processes", In Proceedings of 23th International Conference on Computational Linguistics, (2010) pp. 761-760.

International Search Report (in English and Japanese) issued in International Application PCT/JP2018/041398, dated Jan. 29, 2019; ISA/JP.

* cited by examiner

COMMUNICATION SKILL EVALUATION SYSTEM, COMMUNICATION SKILL EVALUATION DEVICE AND COMMUNICATION SKILL EVALUATION METHOD

CROSS-REFERENCE TO RELATED APPLICATIONS

This application is a 371 National Phase of International Application No. PCT/JP2018/041398, filed on Nov. 7, 2018, which claims priority to Japanese Application No. 2017-217186, filed on Nov. 10, 2017. The entire disclosures of the above applications are incorporated herein by reference.

TECHNICAL FIELD

The present invention relates to a communication skill evaluation system, device, method, and program. In particular, the present invention relates to a communication skill evaluation system, device, method, and program for quantitatively evaluating the communication skill of a participant in a conversation.

BACKGROUND ART

Communication skill is one of the most important skills for a person engaging in social activities with other people. Various indices have been proposed as criteria by which to measure communication skill. For example, it is common to have a subject or another person answer a questionnaire, and to compute an assessment value for measuring communication skill from the responses thereto.

However, in the method for measuring communication skill by using a questionnaire, it is necessary to obtain responses to many questions in the questionnaire. However, when having the subject respond, there is a problem in that accurate responses may not always be obtained.

In order to cope therewith, there are technologies for automatically estimating communication skill on the basis of non-verbal actions during a conversation (see, for example, Patent Document 1). If a person's communication skill can be automatically estimated from the behavior of the person observed in actual conversation situations, as in the technology described in this Patent Document 1, then a person's communication skills can be easily and more objectively estimated.

CITATION LIST

Patent Literature

[Patent Document 1]
Japanese Unexamined Patent Application, First Publication No. 2017-116716 (JP 2017-116716 A)

SUMMARY OF INVENTION

Technical Problem

In the technology described in the abovementioned Patent Document 1, a predictor estimates the probability (representing the appropriateness to be the next speaker; hereinafter referred to as the next-speaker probability) that each person participating in a conversation will be the next speaker, based on feature quantities representing gaze actions, head movements, and respiratory movements at the end of each utterance during the conversation. Furthermore, the predictor estimates communication skill based on differential information relative to the next-speaker probability, in accordance with whether or not each person spoke. For example, the predictor estimates that the communication skill of a person is high if that person spoke when the next-speaker probability output by the predictor was high, and if that person did not speak when the next-speaker probability was low.

In other words, in the technology described in the above-mentioned Patent Document 1, the estimation is performed in two stages that involve estimating the next-speaker probability, then estimating the communication skill on the basis of the estimated next-speaker probability. Generally, the more estimations are based on other estimations, there is a tendency for the communication skill estimation accuracy to become lower. Therefore, improving estimation accuracy is sought.

The present invention is made in consideration of the above-mentioned circumstances, and an objective thereof is to provide a communication skill evaluation system, device, method, and program that are able to evaluate the communication skill of a participant in a conversation with high accuracy.

Solution to Problem

A communication skill evaluation system according to a first aspect of the present invention includes: an audio input device that inputs audio information of participants in a conversation; a measurement device that measures a non-verbal action of the participants during the conversation; an utterance period detection unit that detects, based on the audio information input by the audio input device, an utterance period defined by starting and ending times of each utterance in the conversation, and a participants who spoke in each utterance period; a participatory role assignment unit that defines, as an utterance pair, two utterances obtained in chronological order from each utterance period detected by the utterance period detection unit, and that, in accordance with whether or not each of the participants spoke in each utterance pair, assigns a participatory role to each of the participant, the participatory role indicating that a participant is one of a current speaker who is speaking when the speaker is continuing, a non-speaker who is not the current speaker when the speaker is continuing, a current speaker who stops speaking when the speaker changes, a next speaker who speaks next when the speaker changes, and a non-speaker who is neither the current speaker nor the next speaker when the speaker changes; a feature quantity extraction unit that, based on measurement results by the measurement device, extracts a non-verbal feature quantity for each of the participants, relating to the non-verbal action at the end of the utterance in each utterance period; and an estimation unit that estimates communication skill for each of the participants based on a combination, in each utterance period, of the participatory role assigned by the participatory role assignment unit, and the non-verbal feature quantity extracted by the feature quantity extraction unit.

According to a second aspect of the present invention, in the communication skill evaluation system as in the first aspect, the measurement device measures, as the non-verbal action, at least one of a gaze action, a head movement, a respiratory movement, and a mouth shape change of each of the participants.

According to a third aspect of the present invention, the communication skill evaluation system as in the first aspect further includes: a verbal feature extraction unit that extracts a verbal feature quantity indicating a verbal feature of the utterance in each utterance period, wherein the estimation unit estimates communication skill for each of the participants based on a combination, in each utterance period, of the verbal feature quantity extracted by the verbal feature extraction unit, the participatory role assigned by the participatory role assignment unit, and the non-verbal feature quantity extracted by the feature quantity extraction unit.

A communication skill evaluation device according to a fourth aspect of the present invention includes: an utterance period detection unit that detects, based on audio information of participants in a conversation, an utterance period defined by starting and ending times of each utterance in the conversation, and a participant who spoke in each utterance period; a participatory role assignment unit that defines, as an utterance pair, two utterances obtained in chronological order from each utterance period detected by the utterance period detection unit, and that, in accordance with whether or not each of the participants spoke in each utterance pair, assigns a participatory role to each of the participants, the participatory role indicating that a participant is one of a current speaker who is speaking when the speaker is continuing, a non-speaker who is not the current speaker when the speaker is continuing, a current speaker who stops speaking when the speaker changes, a next speaker who speaks next when the speaker changes, and a non-speaker who is neither the current speaker nor the next speaker when the speaker changes; a feature quantity extraction unit that, based on a measurement result of non-verbal action of each of the participants during the conversation, extracts a non-verbal feature quantity for each of the participants, relating to the non-verbal action at the end of the utterance in each utterance period; and an estimation unit that estimates communication skill for each of the participants based on a combination, in each utterance period, of the participatory role assigned by the participatory role assignment unit, and the non-verbal feature quantity extracted by the feature quantity extraction unit.

According to a fifth aspect of the present invention, in the communication skill evaluation device as in fourth aspect, the feature quantity extraction unit extracts, as the non-verbal feature quantity, a feature quantity representing at least one of a gaze action, a head movement, a respiratory movement, and a mouth shape change of each of the participants.

According to a sixth aspect of the present invention, the communication skill evaluation device as in the fifth aspect further includes: a next-speaker estimation unit that, based on the measurement result of the non-verbal action, estimates a next-speaker probability, which is a probability that each of the participants will speak next, each time when an utterance ends during the conversation; wherein the feature quantity extraction unit further computes, as the non-verbal feature quantity relating to the non-verbal action, a value of a skill determination parameter quantitatively indicating the communication skill of each one of the participants, based on the next-speaker probability of the one of the participants when the one of the participants spoke or when the one of the participants did not speak during the conversation.

According to a seventh aspect of the present invention, the communication skill evaluation device as in fifth aspect further includes: a verbal feature extraction unit that extracts a verbal feature quantity indicating a verbal feature of the utterance in each utterance period, wherein the estimation unit estimates communication skill for each of the participants based on a combination, in each utterance period, of the verbal feature quantity extracted by the verbal feature extraction unit, the participatory role assigned by the participatory role assignment unit, and the non-verbal feature quantity extracted by the feature quantity extraction unit.

A communication skill evaluation method according to an eighth aspect of the present invention includes: a step of an utterance period detection unit detecting, based on audio information of participants in a conversation, an utterance period defined by starting and ending times of each utterance, and the participants who spoke in each utterance period; a step of a participatory role assignment unit defining, as an utterance pair, two utterances obtained in chronological order from the each utterance period detected by the utterance period detection unit; a step of the participatory role assignment unit assigning, in accordance with whether or not each of the participants spoke in each utterance pair, a participatory role to each of the participants, the participatory role indicating that a participant is one of a current speaker who is speaking when the speaker is continuing, a non-speaker who is not the current speaker when the speaker is continuing, a current speaker who stops speaking when the speaker changes, a next speaker who speaks next when the speaker changes, and a non-speaker who is neither the current speaker nor the next speaker when the speaker changes; a step of a feature quantity extraction unit, based on measurement results of non-verbal action of each of the participants during the conversation, extracting a non-verbal feature quantity for each of the participants, relating to the non-verbal action at the end of the utterance in each utterance period; and a step of an estimation unit estimating communication skill for each of the participants based on a combination, in each utterance period, of the participatory role assigned by the participatory role assignment unit, and the non-verbal feature quantity extracted by the feature quantity extraction unit.

A program according to a ninth aspect of the present invention causes a computer to function as the communication skill evaluation device as in one of the fourth to seventh aspects.

Advantageous Effects of Invention

According to the communication skill evaluation system, device, method, and program of the present invention, the communication skill of a participant in a conversation can be evaluated with high accuracy.

DESCRIPTION OF EMBODIMENTS

Hereinafter, examples of modes for carrying out the present invention will be explained in detail with reference to the drawings.

First Embodiment

In the first embodiment, the communication skill of a participant is directly estimated by means of machine learning, in which the inputs are feature quantities representing, in the behavior of people observed during an actual conversation, gaze actions (gaze target transitions), head movements, respiratory movements, mouth shape changes, and the like at the end of each of multiple utterances in a conversation overall. Specifically, for each participant, feature quantities representing what kinds of gaze actions, head movements, respiratory movements, and mouth shape changes occurred at the ends of utterances are used to estimate communication skill in each of the five participatory roles mentioned below.

The conversations handled in the first embodiment may be conversations between participants who are meeting face-to-face, or may be conversations using video images, such as a videophone or a video chat. Additionally, there may be both participants conversing face-to-face and participants conversing by video. Hereinafter, the number of participants in a conversation will be represented by A ("A" being an integer greater than or equal to 2), and the a-th participant ("a" being an integer greater than or equal to 1 and less than or equal to A) will be referred to as participant $P_a$.

Figure 1:
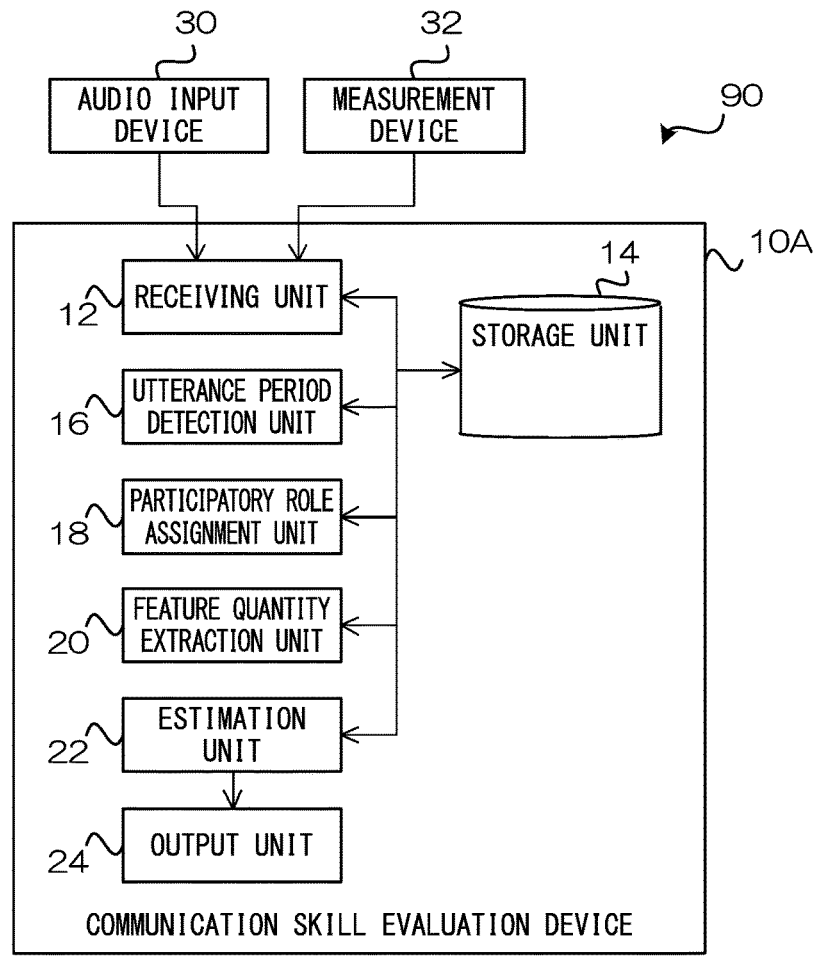
FIG. 1 is a block diagram showing an example of the structure of the communication skill evaluation system according to a first embodiment.

FIG. 1 is a block diagram showing an example of the structure of a communication skill evaluation system 90 according to the first embodiment.

As shown in FIG. 1, the communication skill evaluation system 90 according to the first embodiment includes a communication skill evaluation device 10A, an audio input device 30, and a measurement device 32.

The audio input device 30 is, for example, a microphone, and inputs audio information of the participants during a conversation. There may be a plurality of the audio input devices 30. For example, an audio input device 30 may be worn by each participant.

The measurement device 32 measures non-verbal actions of the participants during a conversation. The non-verbal actions that are measured include at least one of gaze actions, head movements, respiratory movements, and mouth shape changes. There may be a plurality of the measurement devices 32. For example, a measurement device 32 may be worn by each participant.

The communication skill evaluation device 10A includes a receiving unit 12, a storage unit 14, an utterance period detection unit 16, a participatory role assignment unit 18, a feature quantity extraction unit 20, an estimation unit 22, and an output unit 24.

The communication skill evaluation device 10A according to the first embodiment is configured as a computer comprising a CPU (Central Processing Unit), a RAM (Random Access Memory), a ROM (Read-Only Memory), an HDD (Hard Disk Drive), and the like. A communication skill evaluation program according to the first embodiment is stored in the ROM. The communication skill evaluation program may also be stored in the HDD.

The above-mentioned communication skill evaluation program may, for example, be pre-installed in the communication skill evaluation device 10A. This communication skill evaluation program may be stored in a non-volatile storage medium or distributed over a network, and installed, as appropriate, in the communication skill evaluation device 10A. Examples of non-volatile storage media include CD-ROMs (Compact Disc Read-Only Memory), magneto-optic discs, DVD-ROMs (Digital Versatile Disc Read-Only Memory), flash memories, memory cards, and the like.

The CPU functions as the above-mentioned receiving unit 12, utterance period detection unit 16, participatory role assignment unit 18, feature quantity extraction unit 20, estimation unit 22, and output unit 24 by reading and executing the communication skill evaluation program stored in the ROM.

The receiving unit 12 according to the first embodiment receives, from the audio input device 30, audio information from each participant during a conversation, and writes, into the storage unit 14, linked audio information including participant identification information and the audio information of the participant identified by the participant identification information, wherein the audio information is linked to the identification information. The audio information includes information regarding the time at which the voice of the participant was obtained. Additionally, the receiving unit 12 receives, from the measurement device 32, measurement information indicating measurement results relating to non-verbal actions of the participants during the conversation, and writes, into the storage unit 14, linked measurement information including participant identification information and chronological measurement information of the participant identified by the participant identification information, wherein the chronological measurement information is linked to the participant identification information.

The utterance period detection unit 16 according to the first embodiment detects utterance periods defined by the starting and ending times of each utterance based on the linked audio information stored in the storage unit 14, and detects the participant who spoke during each utterance period. Specifically, the utterance period detection unit 16 detects the periods during which each participant spoke on the basis of audio feature quantities obtained from the linked audio information of each participant stored in the storage unit 14, by means of any existing technology. In the first embodiment, the utterance periods of all participants are arranged in chronological order as utterances $IPU^1$, $IPU^2$, ..., $IPU^{K+1}$, with the k-th utterance during a conversation being represented by $IPU^k$, where k is an integer greater than or equal to 1 and less than or equal to K+1, and K+1 is the total number of utterances made during the conversation. The utterance period detection unit 16 generates and outputs utterance information, in which information $U_k$ indicating the utterance periods of each of the utterances $IPU^1, IPU^2, \ldots, IPU^{K+1}$ is linked with information indicating which of the participants $P_1$ to $P_A$ was the speaker of each utterance $IPU^1, IPU^2, \ldots, IPU^{K+1}$.

The participatory role assignment unit 18 according to the first embodiment defines, as an utterance pair, two utterances obtained in chronological order from the utterance periods detected by the utterance period detection unit 16, and assigns, for each utterance pair, a participatory role to each participant. These participatory roles include five roles: (1) a current speaker who is speaking when the speaker is continuing, (2) a non-speaker who is not the current speaker when the speaker is continuing, (3) a current speaker who stops speaking when the speaker changes, (4) a next speaker who speaks next when the speaker changes, and (5) a non-speaker who is neither the current speaker nor the next speaker when the speaker changes. The participatory role assigned to each participant is one of the five roles (1) to (5). Additionally, the utterance pairs mentioned here refer to pairs in which, for each of the utterances forming a conversation, sequentially from the leading utterance, that utterance is paired with the next utterance. A speaker continuation indicates a situation in which a single participant speaks in two utterance periods that are adjacent in the time direction. A speaker change indicates a situation in which different participants speak in two utterance periods that are adjacent in the time direction.

Specifically, the participatory role assignment unit 18 determines, from the utterance pairs of the utterances during a conversation, whether the participants are in a speaker continuation (the same person is continuing to speak) or a speaker change (the speaker changes) situation. In a speaker continuation situation, the participatory role assignment unit 18 sets the speaker as the current speaker and sets the people other than the speaker as non-speakers. On the other hand, in a speaker change situation, the participatory role assignment unit 18 sets the speaker who stops speaking as the current speaker, sets the person who is speaking next as the next speaker, and sets the people other than the current speaker and the next speaker as non-speakers. The participatory role of a participant $P_a$ defined by the utterance pair $IPU^k$ and $IPU^{k+1}$ is represented by $R_{a,k}$. The participatory role $R_{a,k}$ indicates one participatory role, among the five types of participatory roles mentioned above, assigned to the participant $P_a$ during the utterance $IPU^k$.

The feature quantity extraction unit 20 according to the first embodiment extracts, for each utterance period, regarding each participant, a feature quantity relating to a non-verbal action at the end of an utterance in an utterance period, based on the linked measurement information stored in the storage unit 14. Specifically, the feature quantity extraction unit 20 extracts, as feature quantities relating to non-verbal actions, feature quantities representing at least one of gaze actions, head movements, respiratory movements, and mouth shape changes of a participant at the end of an utterance in an utterance period.

The feature quantity extraction unit 20, for example, extracts feature quantities representing each of gaze actions, head movements, respiratory movements, and mouth shape changes as feature quantities to be input to the estimation unit 22 to be explained below. Specifically, as an example of a feature quantity representing gaze actions, an occurrence quantity, such as an occurrence frequency or a number of occurrences, of a gaze target transition pattern, as explained below, is used. Additionally, as an example of a feature quantity representing head movements, a statistical quantity, such as a mean value or a standard deviation, of parameters indicating the head state, as explained below, is used. Alternatively, by setting a threshold value for each parameter at an arbitrarily defined value, the parameters may be split into groups based on the threshold values and an appearance frequency of the parameters in each group may be used as the feature quantity. Additionally, as an example of a feature quantity representing respiratory movements, a statistical quantity, such as a mean value or a standard deviation, of parameters indicating the state of respiration, as explained below, is used. Alternatively, in the case of respiratory movements, as in the case of head movements, by setting a threshold value for each parameter at an arbitrarily defined value, the parameters may be split into groups based on the threshold values and an appearance frequency of the parameters in each group may be used as the feature quantity. Additionally, as an example of a feature quantity representing mouth shape changes, an occurrence quantity, such as an occurrence frequency or a number of occurrences, of a mouth shape transition pattern, as explained below, is used. It is possible to use just some of these feature quantities, or to use all of them.

In the first embodiment, the above-mentioned feature quantities relating to non-verbal actions are computed in situations in which a participant whose communication skills are to be evaluated has one of the five participatory roles. In the first embodiment, it is possible to estimate communication skill with higher accuracy by using feature quantities relating to multiple non-verbal actions in situations in which each participant has a participatory role as obtained from all or part of a conversation.

Figure 2:
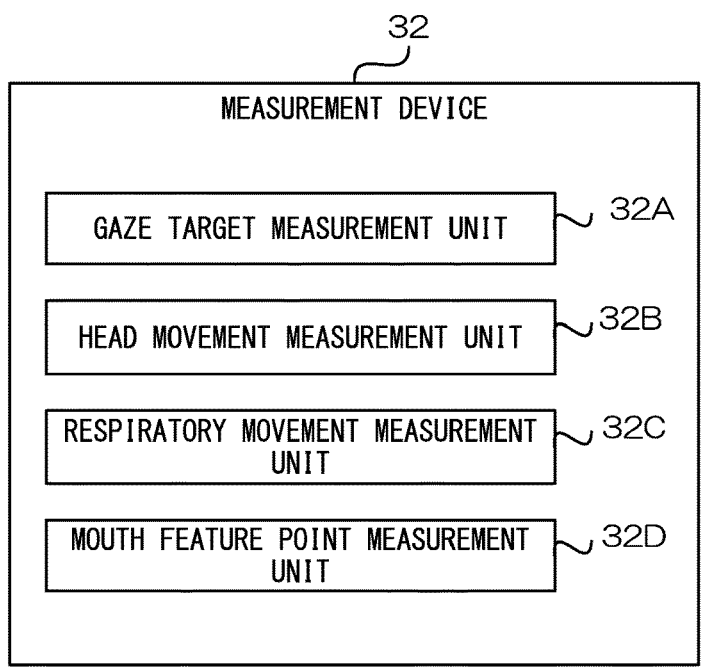
FIG. 2 is a block diagram showing an example of the structure of a measurement device according to the first embodiment.

FIG. 2 is a block diagram showing an example of the structure of a measurement device 32 according to the first embodiment. As shown in FIG. 2, the measurement device 32 according to the first embodiment includes a gaze target measurement unit 32A, a head movement measurement unit 32B, a respiratory movement measurement unit 32C, and a mouth feature point measurement unit 32D.

The feature quantities representing gaze actions will be specifically explained.

Each participant $P_a$ wears the gaze target measurement unit 32A shown in FIG. 2. The gaze target measurement unit 32A measures gaze targets indicating the people at whom the participant has gazed. In this case, the feature quantity extraction unit 20 extracts, as a feature quantity representing gaze actions, an occurrence quantity of gaze target transition patterns for each participant $P_a$, based on the gaze targets obtained by the measurements. For the extraction of feature quantities representing these gaze actions, the technology described, for example, in JP 2017-116716 A (Patent Document 1) or JP 2014-238525 A is used. As the gaze target measurement unit 32A, it is possible to use, for example, a gaze measurement device including a measurer for measuring the orientation of a participant's eyeballs, and a camera having an angle of view corresponding to that of the participant's field of view. The gaze measurement device can acquire a target or a region at which a participant has gazed in an image captured by the camera based on the orientation of the eyeballs.

The above-mentioned gaze target transition pattern, for example, represents the order in which the participant directed his/her gaze on the current speaker, non-speakers and gaze targets other than people during an arbitrary time period. Additionally, the gaze target transition pattern represents, in an n-gram pattern, chronological transitions indicating whether the gazes met when the participant gazed at a person. Specifically, depending on the participants who were gaze targets, the gaze actions are divided into the following types and the gaze targets are labeled. The symbols used as the gaze target labels do not have any particular meaning and any form of notation may be used as long as the labels can be distinguished.

Label S: Glancing at current speaker.

Label $L_q$: Glancing at non-speaker (where q indicates mutually different participants who are non-speakers, and q=1, . . . , A−1; for example, when a certain participant gazes at the non-speaker $P_2$ and the non-speaker $P_3$ in sequence, the non-speaker $P_2$ is assigned the label $L_1$ and the non-speaker $P_3$ is assigned the label $L_2$).

Label N: Glancing at next speaker during speaker change.

Label X: Not looking at anybody. For example, looking at the floor, the ceiling, a wall or the like.

When the label is S, $L_q$ or N, the feature quantity extraction unit 20 adds information as to whether or not there was a mutual gaze (the gazes met). In the first embodiment, when there has been a mutual gaze, the feature quantity extraction unit 20 adds the label M to the ends of the labels S, $L_q$ and N, resulting in SM, $L_qM$ and NM, respectively.

It is known that, when there is a speaker change, the current speaker directs his/her gaze at the next speaker and the next speaker directs his/her gaze at the current speaker so that there is a mutual gaze, after which the next speaker starts speaking and removes his/her gaze from the current speaker. For this reason, the people other than the current speaker are not all treated together as L, and when there is a speaker change, a different gaze target label (the label N in the first embodiment) is used for the next speaker. By using information indicating that the participants gazed at the next speaker, the gaze target transition pattern is made into a more useful feature quantity.

For each participant $P_a$, an n-gram pattern, which is an example of a gaze target transition pattern taking the temporal sequence into consideration, is generated by using the above-mentioned gaze target labels as constituents. The term 'n' in the n-gram pattern is a positive integer, and is 2 in the first embodiment.

Figure 3:
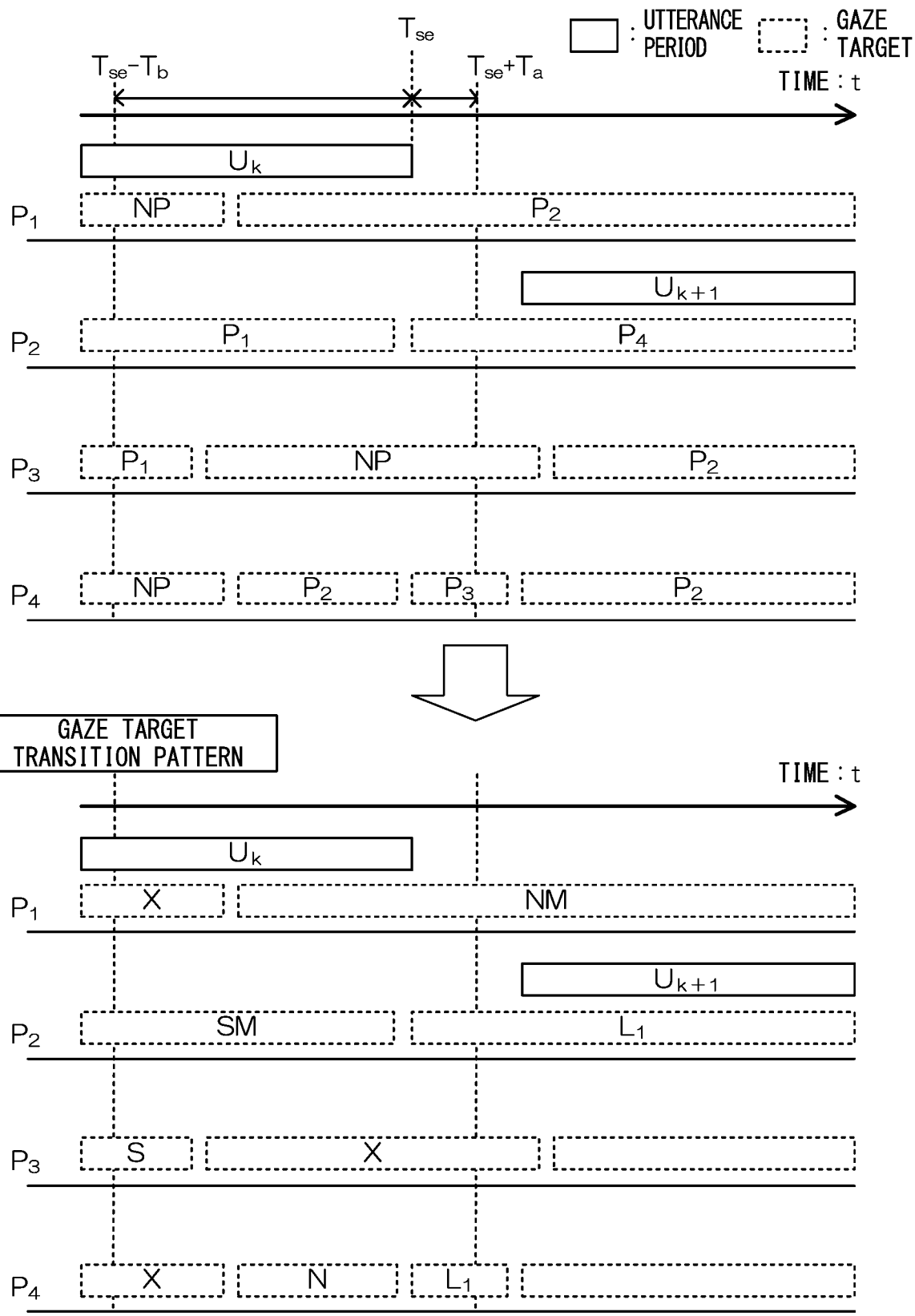
FIG. 3 is a diagram showing an example of a gaze target transition pattern according to the first embodiment.

FIG. 3 is a diagram showing an example of a gaze target transition pattern according to the first embodiment. FIG. 3 shows a preparation example of a gaze target transition pattern when there has been a speaker change from a participant $P_1$ to a participant $P_2$.

In the preparation example shown in FIG. 3, the number of participants in the conversation is 4 (A=4), and the utterance periods $U_k$, $U_{k+1}$ and the gaze targets of each of the participants are indicated chronologically. Additionally, the term '$T_{se}$' indicates the utterance ending time of the utterance period $U_k$. In this case, for example, the gaze actions that occurred in the period from the time $T_{se}-T_b$ before the utterance ending time $T_{se}$ of the utterance period $U_k$ until the time $T_{se}+T_a$ after the utterance ending time $T_{se}$ is considered. The terms '$T_b$' and '$T_a$' may be any values that are more than or equal to 0, but for reference, it is appropriate for $T_b$ to be within the range from at least 500 milliseconds to at most 1500 milliseconds and for $T_a$ to be within the range from at least 0 milliseconds to at most 500 milliseconds.

As shown in FIG. 3, the current speaker $P_1$ gazed at a non-person target NP, and thereafter gazed at the next speaker $P_2$. Then, in the time period during which the current speaker $P_1$ gazed at the next speaker $P_2$, the next speaker $P_2$ also gazed at the current speaker $P_1$, resulting in a mutual gaze. Therefore, the gaze target labels of the current speaker $P_1$ are assigned the label X and the label NM. On the other hand, after the mutual gaze with the current speaker $P_1$, the next speaker $P_2$ gazed at the non-speaker $P_4$ (no mutual gaze). Therefore, the gaze target labels of the next speaker $P_2$ are assigned the label SM and the label $L_1$. Additionally, the non-speaker $P_3$ gazed at the current speaker $P_1$, and thereafter gazed at a non-person target NP. Therefore, the gaze target labels of the non-speaker $P_3$ are assigned the label S and the label X. Additionally, the non-speaker $P_4$ gazed at a non-person target NP, and thereafter gazed at the next speaker $P_2$ and the non-speaker $P_3$, in this order. Therefore, the gaze target labels of the non-speaker $P_4$ are assigned the label X, the label N, and the label $L_1$.

According to the example shown in FIG. 3, it is shown that the gaze target transition patterns differ in accordance with the participatory role during each of speaker continuation and speaker change. A feature quantity indicated by the n-gram pattern is represented by $f_{g,n}$, and a feature quantity indicated as an occurrence quantity of this n-gram pattern is represented by $f_{a,g}$ (hereinafter, the gaze feature quantity $f_{a,g}$). This gaze feature quantity $f_{a,g}$ is derived for each participant $P_a$ using the feature quantity $f_{g,n}$.

Next, the feature quantities representing head movements will be specifically explained.

Each participant $P_a$ wears the head movement measurement unit 32B (for example, a head tracker or the like) shown in FIG. 2. The head movement measurement unit 32B measures the head movements of the participant. In this case, the feature quantity extraction unit 20 extracts, as a feature quantity representing head movements, a statistical quantity obtained from parameters indicating the head state of the participant $P_a$ in each utterance period, based on head movements obtained by taking measurements. For the extraction of these feature quantities representing head movements, the technology described, for example, in JP 2016-111426 A is used.

The amounts of change in the position and rotation angle of the head that are considered in the first embodiment are obtained on the basis of at least one type of information representing a total of six degrees of freedom including changes in the three degrees of freedom in positions in directions of front-rear, left-right and up-down of the head and changes in three degrees of freedom in rotation angles of the directions. The information representing the six degrees of freedom is measured, for example, with the head movement measurement unit 32B, defined as position information and rotation information in six degrees of freedom including the three-dimensional position (X, Y, Z) and the rotation angle (azimuth, elevation, roll) in three degrees of freedom, each of the coordinate values representing a position and a rotation angle. The X-axis direction is the left-right direction relative to the head of the participant $P_a$, the Y-axis direction is the front-rear direction relative to the head, and the Z-axis direction is the up-down direction relative to the head. The directions of the rotation axes of each of the rotation angles (azimuth, elevation, roll) are represented the Z, Y and X axis directions, respectively.

It is known that the head movements (for example, head shifting, turning and the like) of current speakers near the ends of utterances are different between cases in a speaker continuation and in a speaker change, and that the head movements near the ends of utterances are different between a case in which the non-speaker becomes the next speaker and a case in which he/she does not. For example, when there are four participants, the amounts of change in the head positions X, Y and Z and the rotation angle, roll, of the current speaker, the wave amplitudes (hereinafter also referred to simply as "amplitudes") when the changes in the head movements relating to the head positions Y and Z and the rotation angle, roll, are represented as waves, and the wave frequencies (hereinafter also referred to simply as "frequencies") when the changes in head movements in the rotation angle, elevation, are represented as waves tend to become larger when there is a speaker change than when there is a speaker continuation. These amounts of change, amplitudes, and frequencies are used as an example of the parameters indicating the head state.

Additionally, it is known that the frequency of the head position Y of the current speaker tends to become smaller when there is a speaker change than when there is a speaker continuation. Additionally, the amounts of change and the amplitudes of the head positions X, Y and Z and the rotation angles, azimuth, elevation and roll, are larger in non-speakers and the next speaker when there is a speaker change than those in non-speakers when there is a speaker continuation. Conversely, the frequency of the head positions X, Y and Z and the rotation angles, azimuth, elevation and roll, tends to become smaller in non-speakers and the next speaker when there is a speaker change than those in non-speakers when there is a speaker continuation. The amounts of change in the head positions X and Z tend to be larger in the next speaker than those in non-speakers when there is a speaker change. Conversely, the frequency in the head position Z tends to be smaller in the next speaker than that in non-speakers when there is a speaker change.

However, these tendencies are merely examples, and the tendencies are not necessarily the same for all situations and conversations. Nevertheless, there is a strong correlation between such head movements and participatory roles, and the use of feature quantities representing head movements is very useful in estimating communication skill. A feature quantity indicated by the parameters indicating the head state is represented by $f_{h,n}$, and a feature quantity indicated as a statistical quantity of these parameters indicating the head state is represented by $f_{a,h}$ (hereinafter, the head movement feature quantity $f_{a,h}$). This head movement feature quantity $f_{a,h}$ is derived for each participant $P_a$ by using the feature quantity $f_{h,n}$.

Next, the feature quantities representing respiratory movements will be specifically explained.

Each participant $P_a$ wears the respiratory movement measurement unit 32C shown in FIG. 2. The respiratory movement measurement unit 32C measures the respiratory movements of the participant. In this case, the feature quantity extraction unit 20 extracts, as a feature quantity representing respiratory movements, a statistical quantity obtained from parameters indicating the state of respiration of the participant $P_a$ in each utterance period based on respiratory movements obtained by taking measurements. For the extraction of these feature quantities representing respiratory movements, the technology described, for example, in JP 2017-116716 A (Patent Document 1) is used.

The respiratory movements of a participant in a conversation are strongly connected to the participatory roles, as in the case of the above-mentioned gaze actions and head movements. Thus, respiratory movements of the participants in a conversation are measured in real-time, and feature quantities representing characteristic respiratory movements for each participatory role are extracted from the measured respiratory movements. Specifically, as a characteristic of respiratory movements that are performed immediately before starting to speak, a current speaker who is speaking, when continuing to speak (when there is a speaker continuation), will suddenly take a breath immediately after the end of an utterance. On the other hand, when the current speaker will not be speaking next (when there is a speaker change), a breath will be taken more slowly and some time after the end of the utterance in comparison to when there is a speaker continuation. Additionally, when there is a speaker change, the next speaker who is to speak next will take a large breath in comparison to non-speakers who are not to speak. Such respiration taken before an utterance is performed at about the same timing relative to the start of an utterance. The first embodiment focuses on the inhalation of breaths by the participants, and information such as the inhalation amounts of breaths, the lengths of the inhalation periods, and the timings thereof are used as examples of the parameters indicating the respiration state.

For example, a respiratory movement measurement unit 32C having a band-shape outputs a value indicating the degree of depth of respiration based on the intensity of stretching and shrinking of a band attached to the breast of a participant. The larger the breath that is inhaled, the more the band stretches, and the larger the breath that is exhaled, the more the band shrinks (the stretching of the band becomes smaller). A value indicating this degree of depth of respiration is referred to as the RSP value. This RSP value is different for each participant $P_a$ in accordance with the intensity of the stretching and shrinking of the band. Therefore, in order to eliminate the resulting differences in the RSP value between participants $P_a$, the RSP value may be normalized for each participant $P_a$ by using the mean value and the standard deviation of the RSP value for each participant $P_a$. A feature quantity indicated by the parameters indicating the respiration state is represented by $f_{r,n}$, and a feature quantity indicated as a statistical quantity of these parameters indicating the respiration state is represented by $f_{a,r}$ (hereinafter, the respiratory movement feature quantity $f_{a,r}$). This respiratory movement feature quantity $f_{a,r}$ is derived for each participant $P_a$ using the feature quantity $f_{r,n}$.

Next, the feature quantities representing mouth shape changes will be specifically explained. Here, the mouth shape refers to the shape of the mouth.

The mouth feature point measurement unit 32D shown in FIG. 2 is provided for each participant $P_a$. The mouth feature point measurement unit 32D uses an imaging device or the like to acquire, in real-time, during a conversation, images of a region (for example, the face or the upper body) of the participant including at least the mouth (lips). In this case, the feature quantity extraction unit 20 extracts, as a feature quantity representing mouth shape changes, an occurrence quantity of mouth shape transition patterns for each participant $P_a$ in each utterance period, based on the acquired images.

The above-mentioned mouth shape transition pattern uses an n-gram pattern to represent chronological transitions in parameters indicating mouth shape changes in an arbitrary time period.

Figure 4:
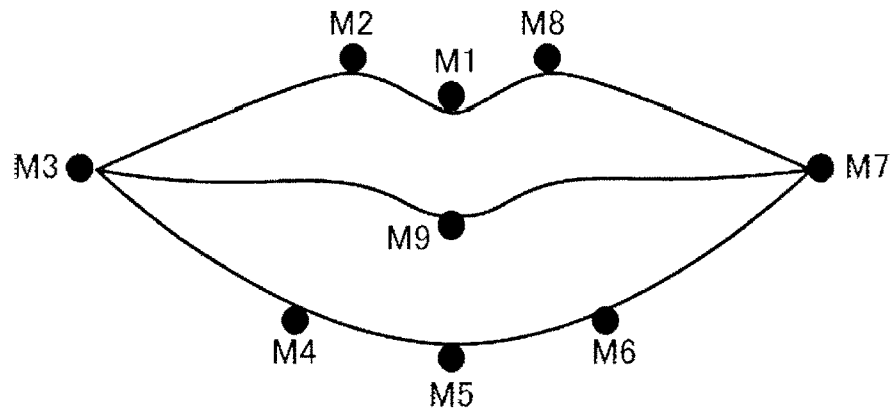
FIG. 4 is a diagram showing an example of mouth feature points according to the first embodiment.

FIG. 4 is a diagram showing an example of mouth feature points in the first embodiment.

The shape of the mouth in the first embodiment refers, for example, to feature points on an outline of the mouth, as shown in FIG. 4, measured by using facial feature point measurement technology making use of image processing technology, or shape information formed on the basis of feature point groups.

In the example shown in FIG. 4, the philtrum is defined as M1, the left and right peaks of the upper lip are defined as M2 and M8, the left and right corners of the mouth are defined as M3 and M7, the lower tip of the upper lip is defined as M9, the lower peak of the lower lip is defined as M5, and the left and right midsections of the peak of the lower lip are defined as M4 and M6. Though dependent on the measurement method, in the first embodiment, as the approximate positions of these feature points, two-dimensional coordinates in the images or three-dimensional positional coordinates in the camera coordinate system or in a world coordinate system are measured. The method for measuring the position of each feature point is not particularly limited, and a commonly used technology may be employed.

As in the case of the above-mentioned gaze actions, head movements and respiratory movements, the mouth shape changes of a participant in a conversation are strongly connected to the participatory roles. In other words, it is known that mouth shape changes in current speakers near the ends of utterances are different between cases in which the current speaker who is speaking is to continue speaking (when there is a speaker continuation) and cases in which the current speaker is not to continue speaking (when there is a speaker change). Additionally, it is known that mouth shape changes in non-speakers near the ends of utterances are different between cases in which the non-speaker who is not speaking is to newly start speaking (in other words, is to become the next speaker) and cases in which the non-speaker is not to newly start speaking.

As one example, during a conversation, a current speaker will more frequently close his/her mouth from a state in which the mouth is slightly open near the end of an utterance when there is a speaker change than when there is a speaker continuation. This is thought to be because, in order to end the utterance, the current speaker must stop speaking and close his/her mouth. Conversely, a current speaker will more frequently close his/her mouth from a state in which the mouth is slightly open, and then slightly open his/her mouth again, or will more frequently keep his/her mouth slightly open, near the end of an utterance when there is a speaker continuation than when there is a speaker change. This is thought to be because, in order to continue speaking, the current speaker must catch a breath or keep his/her mouth open.

Additionally, during a conversation, a non-speaker during a speaker continuation of a current speaker will, with high frequency, keep his/her mouth closed, and a non-speaker (a person, among the non-speakers, who will not be the next speaker) during a speaker change of a current speaker will, with high frequency, keep his/her mouth largely open. Additionally, the next speaker (a person, among the non-speakers, who will be the next speaker) during a speaker change of a current speaker will, with high frequency, open his/her mouth from a state in which his/her mouth is closed. It is thought that such features are observed because, when a non-speaker is to speak next, he/she must take a breath in order to speak, and must open his/her mouth in order to speak.

These tendencies are merely examples, and the tendencies are not necessarily completely the same for all situations and conversations, but this makes no difference in the fact that it is useful to use feature quantities representing mouth shape changes.

The feature quantity extraction unit 20 according to the first embodiment receives, as inputs, feature point position information from the mouth feature point measurement unit 32D. Additionally, the feature quantity extraction unit 20 receives, as inputs, speaker information and utterance period starting times and ending times detected by the utterance period detection unit 16.

The feature quantity extraction unit 20 extracts mouth shape change information of current speakers and non-speakers before and after the ends of utterances based on feature point position information, speaker information and utterance period ending times. The time periods during which the feature quantity extraction unit 20 according to the first embodiment observes mouth shape changes are defined based on an utterance ending time $T_{se}$ of an utterance period as a base point, from the time $T_{se}-T_b$ before the utterance period ended to the time $T_{se}+T_a$ after the utterance period ended. The values of $T_a$ and $T_b$ defining the utterance periods may be arbitrary values. It is also possible to make use of mouth shape change information near arbitrary times (for example, near times at which estimations are made), without being limited to mouth shape changes before and after the ends of utterances.

As the mouth shape change information of a current speaker and a non-speaker from the time $T_{se}-T_b$ before the utterance period ended to the time $T_{se}+T_a$ after the utterance period ended, it is possible to use information representing state changes in various parameters indicated in (1-1) to (1-3) below.

(1-1) The distance between arbitrary mouth feature points. For example, the distance between the upper lip and the lower lip (the distance between the feature point M1 and the feature point M5).

(1-2) The areas of regions surrounded by arbitrary mouth feature points Mc (c=1, . . . , 9).

(1-3) The shapes of regions surrounded by arbitrary mouth feature points Mc (e.g., elliptical, diamond-shaped, etc.).

As a method for the feature quantity extraction unit 20 to record these parameter state changes, it is possible to use the parameters sampled at arbitrary times directly as the mouth shape change information. Additionally, the parameters may be quantized by using threshold values or the like, and changes therein may be recognized. For example, when considering the distances between arbitrary mouth feature points Mc, the shape of the mouth may be defined, for example, as the following (2-1) to (2-3), in accordance with threshold values S and L (L>S) for the distance D between the feature point M1 and the feature point M5.

(2-1) When the distance D is smaller than the threshold value S (D<S), the mouth is closed (label X).

(2-2) When the distance D is at least the threshold value S and smaller than the threshold value L (L>D≥S), the mouth is slightly open (label S).

(2-3) When the distance D is at least the threshold value L (D≥L), the mouth is wide open (label L).

Furthermore, the feature quantity extraction unit 20 uses an n-gram pattern, which is an example of a mouth shape transition pattern, to represent how the states of these parameters transitioned from the time $T_{se}-T_b$ before the utterance period ended to the time $T_{se}+T_a$ after the utterance period ended. For example, when there is a change from a state in which the mouth is largely open (D≥L) to a state in which the mouth is slightly open (L>D≥S), the n-grain pattern indicates a label L and a label S. Such n-gram patterns are extracted for each of the non-speakers and the current speaker. It is also possible to extract n-gram patterns for other parameters by means of similar methods. A feature quantity indicated by an n-gram pattern is represented by $f_{m,n}$, and a feature quantity indicated as an occurrence quantity of this n-gram pattern is represented by $f_{a,m}$ (hereinafter, the mouth shape feature quantity $f_{a,m}$). This mouth shape feature quantity $f_{a,m}$ is derived for each participant $P_a$ using the feature quantity $f_{m,n}$.

On the basis of the above, for each participant, a participatory role $R_n$ obtained by the participatory role assignment unit 18, and at least one feature quantity among a gaze feature quantity $f_{a,g}$, a head movement feature quantity $f_{a,h}$, a respiratory movement feature quantity $f_{a,r}$, and a mouth shape feature quantity $f_{a,m}$, obtained by the feature quantity extraction unit 20, are input to the estimation unit 22.

In other words, the estimation unit 22 according to the first embodiment estimates, for each participant, the communication skill of that participant, by taking as inputs, for each utterance period, a combination of the participatory role of that participant assigned, by the participatory role assignment unit 18, for an utterance pair including two utterances in utterance periods, and feature quantities of that participant in the utterance period, extracted by the feature quantity extraction unit 20.

In the first embodiment, a pre-trained machine learning model is used to estimate the communication skill $S_a$ of a participant $P_a$ by taking, as inputs, a combination of the participatory role of the participant $P_a$ assigned by the participatory role assignment unit 18, and feature quantities of the participant $P_a$, extracted by the feature quantity extraction unit 20.

For the machine learning, it is possible to apply, for example, an SVM (Support Vector Machine), a GMM (Gaussian Mixture Model), an HMM (Hidden Markov Model), an NN (Neural Network), or the like. When training a model, for an arbitrary participant $P_a$, for each participatory role, at least one feature quantity among a gaze feature quantity $f_{a,g}$, a head movement feature quantity $f_{a,h}$, a respiratory movement feature quantity $f_{a,r}$, and a mouth shape feature quantity $f_{a,m}$, is defined as input information, and a skill assessment value $S_a$ of that participant is defined as correct information. Combinations of the input information and the correct information are formed, and data comprising a plurality of these combinations is used as training data.

For the participant skill assessment value, for example, an arbitrary skill assessment value including the skill assessment values described in the Reference Documents A and B indicated below may be applied.

[Reference Document A] Mark H. Davis, "A Multidimensional Approach to Individual Differences in Empathy", JSAS Catalog of Selected Documents in Psychology, Vol. 10(85), 1980.

[Reference Document B] Mark H. Davis, "Measuring individual differences in empathy: Evidence for a multidimensional approach", Journal of Personality and Social Psychology, Vol. 44(1), 1983, pp. 113-126.

Additionally, as one example, the skill assessment value acquisition method in the first embodiment may involve acquisition by using the replies of the participants to a prescribed questionnaire, but it is also possible to use other methods, such as using assessments made by a specific evaluator.

The output unit 24 according to the first embodiment outputs the communication skill $S_a$ of each participant $P_a$ estimated by the estimation unit 22.

Figure 5:
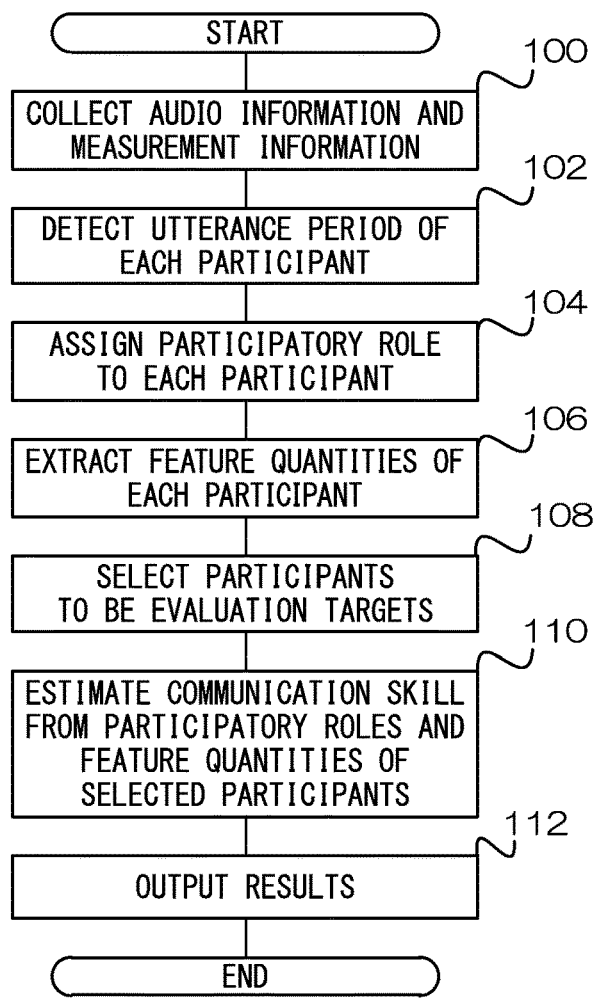
FIG. 5 is a flowchart showing an example of the processing flow in a communication skill evaluation program according to the first embodiment.

Next, the functions of the communication skill evaluation device 10A according to first embodiment will be explained with reference to FIG. 5. FIG. 5 shows a flowchart indicating an example of the processing flow in a communication skill evaluation program according to the first embodiment.

First, in Step 100 in FIG. 5, the receiving unit 12 collects audio information of the participants, input from the audio input devices 30, and collects measurement information of the participants, input from the measurement devices 32. The receiving unit 12 stores, in the storage unit 14, linked audio information in which participants are linked to audio information, and stores, in the storage unit 14, linked measurement information in which participants are linked to measurement information In Step 102, the utterance period detection unit 16 detects, on the basis of the linked audio information stored in the storage unit 14, utterance periods defined by the starting and ending times of the utterances, and the participants that spoke during each utterance period.

In Step 104, the participatory role assignment unit 18 forms utterance pairs from two utterances obtained in chronological order from the utterance periods detected in the above-mentioned Step 102, and assigns a participatory role to each participant in each utterance pair. As mentioned above, this participatory role indicates one of a current speaker who is speaking during a speaker continuation, a non-speaker who is not the current speaker during a speaker continuation, a current speaker who stops speaking during a speaker change, a next speaker who is to speak next during a speaker change, and a non-speaker who is neither the current speaker nor the next speaker during a speaker change.

In Step 106, the feature quantity extraction unit 20 extracts, for each participant, during each utterance period, feature quantities relating to non-verbal actions at the ends of utterances in the utterance periods, based on the linked measurement information stored in the storage unit 14.

In Step 108, the estimation unit 22 selects participants who are to be evaluation targets in accordance with a selection operation by a user.

In Step 110, the estimation unit 22 estimates, for each participant selected as mentioned above, the communication skill of that participant, by taking as inputs, for each utterance period, a combination of the participatory role of the participant assigned for an utterance pair including an utterance in the utterance period in Step 104 above, and feature quantities in the utterance period, extracted in Step 106 above.

In Step 112, the output unit 24 outputs the communication skill results estimated for each of the participants selected as evaluation targets, and the series of processes by the present communication skill evaluation program end.

Thus, according to the first embodiment, it is possible to evaluate, with high accuracy, the communication skill of a participant in a conversation, from various types of behavior.

Additionally, it is possible to make robust estimates, even when some of the behavior cannot be acquired well, because the estimates are made by using various types of behavior (multimodal information).

Furthermore, while there are various assessment value computation methods (equivalent to definitions of correctness) for evaluating communication skill, the feature quantities that are useful for making predictions will generally differ in accordance with the definition of correctness in machine learning. In the first embodiment, by using multimodal information as feature quantities, it is possible to handle various definitions of correctness.

Second Embodiment

In the above-mentioned first embodiment, the measurement results from the measurement device 32 were used to extract a gaze feature quantity $f_{a,g}$, a head movement feature quantity $f_{a,h}$, a respiratory movement feature quantity $f_{a,r}$, and a mouth shape feature quantity $f_{a,m}$. In the second embodiment, in addition to these feature quantities, a skill determination parameter that is estimated from the next-speaker probability is further extracted as a feature quantity.

Figure 6:
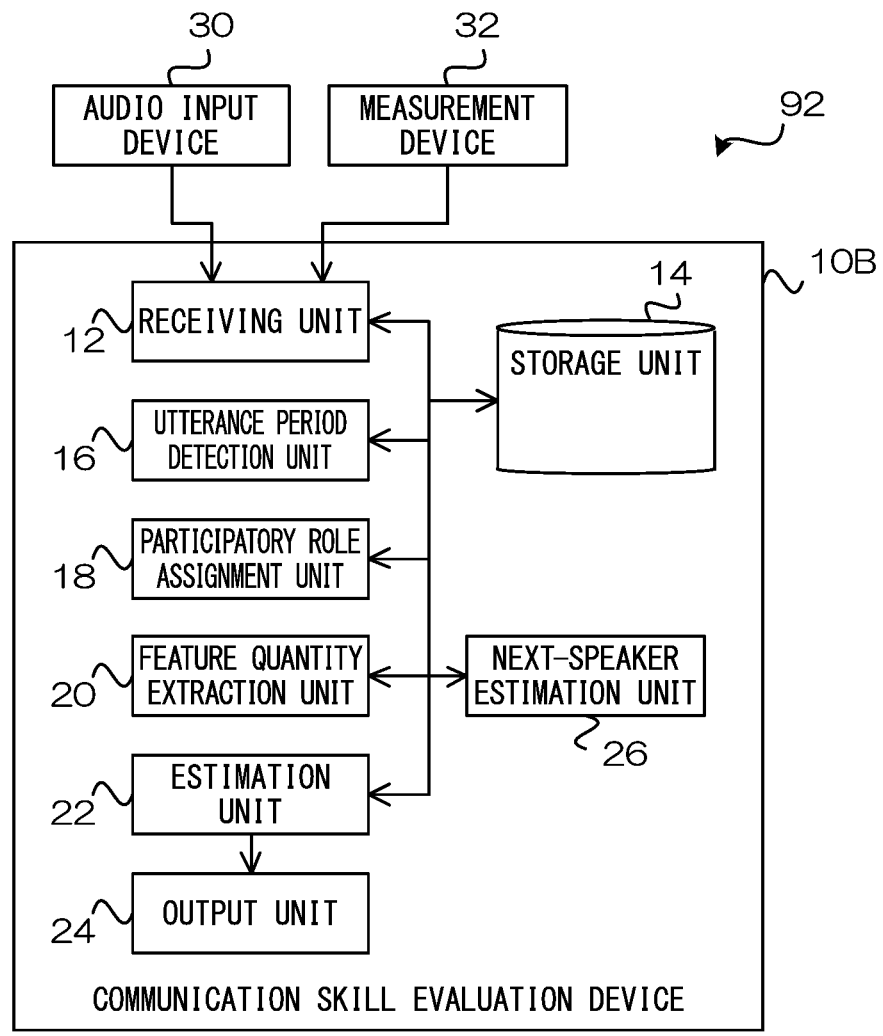
FIG. 6 is a block diagram showing an example of the structure of a communication skill evaluation system according to a second embodiment.

FIG. 6 is a block diagram showing an example of the configuration of a communication skill evaluation system 92 according to the second embodiment.

As shown in FIG. 6, the communication skill evaluation system 92 according to the second embodiment includes a communication skill evaluation device 10B. The structural elements that are the same as those in the communication skill evaluation system 90 according to the above-described first embodiment will be assigned the same reference numbers and redundant explanations will be omitted.

The communication skill evaluation device 10B according to the second embodiment includes a receiving unit 12, a storage unit 14, an utterance period detection unit 16, a participatory role assignment unit 18, a feature quantity extraction unit 20, an estimation unit 22, and an output unit 24, and further includes a next-speaker estimation unit 26.

The next-speaker estimation unit 26 according to the second embodiment estimates a next-speaker probability, which is the probability that each participant will speak next, after each utterance ends during a conversation, based on non-verbal action measurement results.

The feature quantity extraction unit 20 according to the second embodiment further computes, as a feature quantity relating to non-verbal actions, the value of a skill determination parameter quantitatively representing the communication skill of a participant, based on the next-speaker probability of the participant when the participant spoke or when the participant did not speak during the conversation. For the estimation of the next-speaker probability and the computation of the skill determination parameter, for example, the technology described in JP 2017-116716 A (Patent Document 1) is used.

The above-mentioned skill determination parameter is a score based on the next-speaker probability and information indicating that a participant has actually become the next speaker. In this case, for example, the skill determination parameter and at least one feature quantity among a gaze feature quantity $f_{a,g}$, a head movement feature quantity $f_{a,h}$, a respiratory movement feature quantity $f_{a,r}$, and a mouth shape feature quantity $f_{a,m}$ are simultaneously input, and an early-fusion method in which a learning model is trained by using machine learning is applied. Additionally, it is also possible to use a later-fusion method in which a final evaluation value is derived by using an output value obtained by a learning model taking at least one feature quantity among a gaze feature quantity $f_{a,g}$, a head movement feature quantity $f_{a,h}$, a respiratory movement feature quantity $f_{a,r}$, and a mouth shape feature quantity $f_{a,m}$ as an input, and an output value obtained by a learning model taking the skill determination parameter as an input. As this final evaluation value, for example, the average of the above-mentioned two output values is used.

According to the second embodiment, it is possible to make more robust estimates, even when some of the behavior involving non-verbal actions cannot be acquired well, because the skill determination parameter can further be used as a feature quantity.

Third Embodiment

The communication skill evaluation system 90 in the first embodiment estimates the communication skill assessment values $S_a$ of participants based on feature quantities relating to one or more non-verbal actions, and the participatory roles of the participants in a conversation. The communication skill evaluation system 94 in the third embodiment estimates communication skill assessment values $S_a$ of participants by using feature quantities based on the utterances in a conversation in addition to feature quantities relating to non-verbal actions and participatory roles. Hereinafter, a feature quantity based on utterances in a conversation is referred to as a verbal feature quantity.

Figure 7:
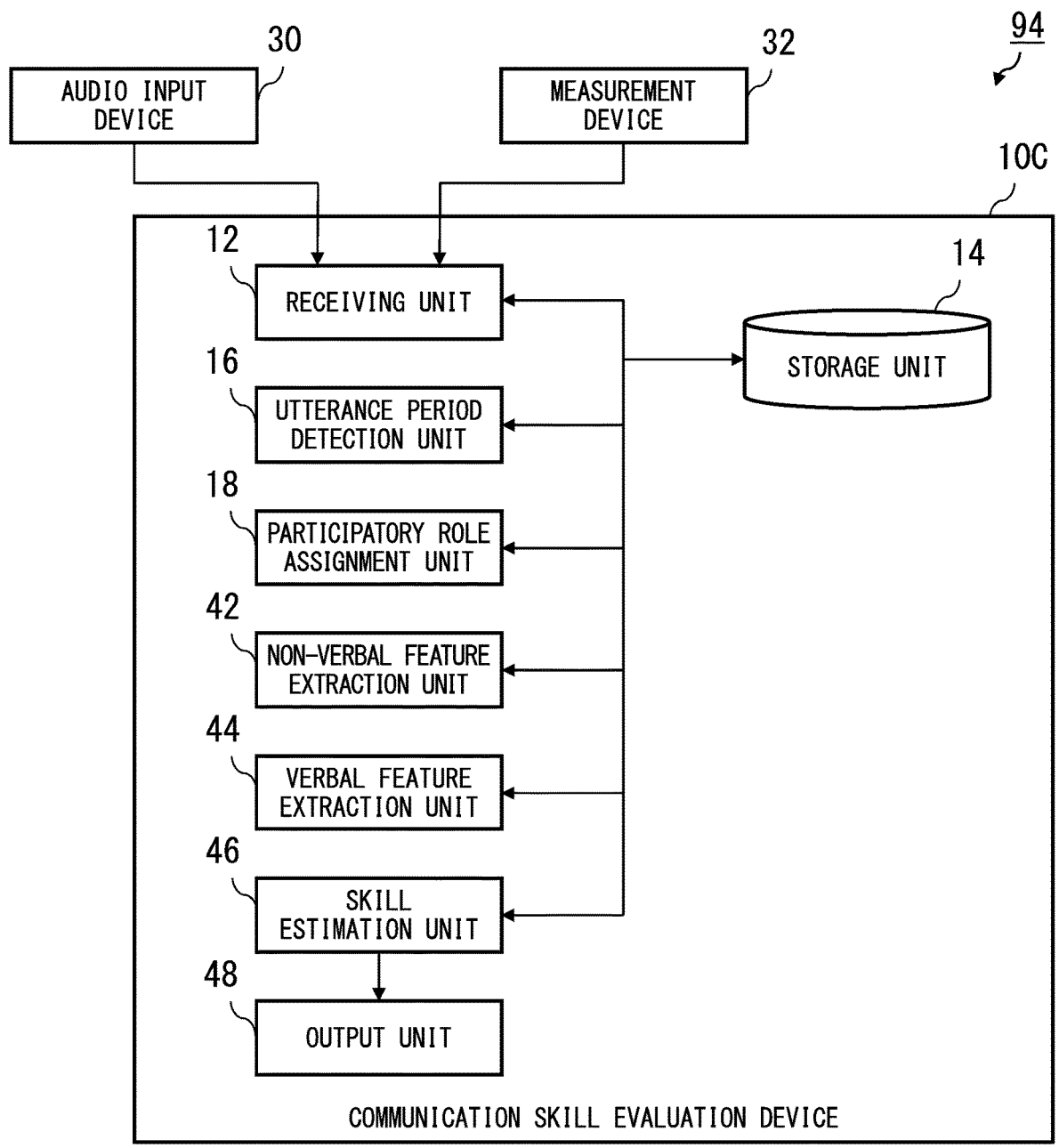
FIG. 7 is a diagram showing an example of the structure of a communication skill evaluation system according to a third embodiment.

FIG. 7 is a diagram showing a structural example of a communication skill evaluation system 94 in the third embodiment. The communication skill evaluation system 94 includes an audio input device 30, a measurement device 32 and a communication skill evaluation device 10C. The audio input device 30 and the measurement device 32 in the third embodiment have structures and perform actions that are respectively similar to the audio input device 30 and the measurement device 32 in the first and second embodiments.

The communication skill evaluation device 10C includes a receiving unit 12, a storage unit 14, an utterance period detection unit 16, a participatory role assignment unit 18, a non-verbal feature extraction unit 42, a verbal feature extraction unit 44, a skill estimation unit 46, and an output unit 48. The receiving unit 12, the storage unit 14, the utterance period detection unit 16, and the participatory role assignment unit 18 in the third embodiment perform functions similar to those of the receiving unit 12, the storage unit 14, the utterance period detection unit 16, and the participatory role assignment unit 18 in the first embodiment, respectively.

The non-verbal feature extraction unit 42 extracts feature quantities relating to non-verbal actions of the participants in each utterance period detected during a conversation. In other words, the non-verbal feature extraction unit 42 functions as a feature quantity extraction unit. The non-verbal feature extraction unit 42 extracts feature quantities relating to the non-verbal actions of each participant in each utterance period by functioning in a manner similar to the feature quantity extraction unit 20 in the first embodiment. The non-verbal feature extraction unit 42 generates non-verbal feature quantities of each participant from the extracted feature quantities. The non-verbal feature quantities include gaze feature quantities $f_{a,g}$, head movement feature quantities $f_{a,h}$, respiratory movement feature quantities $f_{a,r}$ and mouth shape feature quantities $f_{a,m}$ representing feature quantities, respectively, of gaze actions, head movements, respiratory movements, and mouth shape changes. Instead of the four feature quantities for gaze actions, head movements, respiratory movements and mouth shape changes, the non-verbal feature quantities may include at least one of the four feature quantities.

The verbal feature extraction unit 44 extracts verbal feature quantities from the utterances in utterance periods detected by the utterance period detection unit 16. The verbal feature extraction unit 44 converts utterances included in the linked audio information stored in the storage unit 14 to text data in each utterance period. The verbal quantity extraction unit 44 extracts verbal features corresponding to each utterance by analyzing the text data. The verbal features extracted by the verbal feature extraction unit 44 include the number of occurrences of parts of speech, the number of occurrences of evaluative expressions, the number of occurrences of emotional expressions, labels for dialog acts, utterance categories (topics), the number of occurrences of dependencies, and the number of occurrences of specific expressions. The verbal feature extraction unit 44 computes verbal feature quantities for each utterance based on the verbal features extracted for each utterance.

The verbal feature extraction unit 44 divides the text indicated by text data into units having meaning, such as words, phrases and clauses, by means of morphological analysis, and identifies parts of speech for each word included in the text. The verbal feature extraction unit 44 counts the number of occurrences of each identified part of speech and uses the number of occurrences of the part of speech as one of the parameters indicating a verbal feature.

The verbal feature extraction unit 44 determines whether or not an evaluative expression is included in text represented by text data. When a word associated with evaluation is included in the text, the verbal feature extraction unit 44 determines that an evaluative expression is included in the text. When an evaluative expression is included in the text, the verbal feature extraction unit 44 acquires the polarities of the words. The verbal feature extraction unit 44 counts the number of occurrences of the polarities in the text and uses the number of occurrence of polarities as one of the parameters indicating a verbal feature. The verbal feature extraction unit 44 may use an evaluative expression dictionary that stores multiple combinations of polarities and words associated with evaluation to determine whether or not the evaluative expressions are included in the text. The evaluative expression dictionary may be prestored in the storage unit 14. The verbal feature extraction unit 44 may also use an evaluative expression dictionary stored in another device through a network. Words associated with evaluation are, for example, "good", "bad", "like", "dislike", and the like, the polarities of the respective words being "positive", "negative", "positive", and "negative".

The verbal feature extraction unit 44 determines whether or not an emotional expression is included in text represented by text data. When a word associated with emotions is included in the text, the verbal feature extraction unit 44 determines that an emotional expression is included in the text. When an emotional expression is included in the text, the verbal feature extraction unit 44 acquires attributes of the words. The verbal feature extraction unit 44 counts the number of occurrences of the attributes in the text and uses the number of occurrences of attributes as one of the parameters indicating a verbal feature. The verbal feature extraction unit 44 may use an emotional expression dictionary that stores multiple combinations of attributes and words associated with emotions to determine whether or not the emotional expressions are included in the text. The emotional expression dictionary may be prestored in the storage unit 14. The verbal feature extraction unit 44 may also use an emotional expression dictionary stored on another device through a network. Words associated with emotions are, for example, "friendship", "delight", "hate", and the like, the attributes of the respective words being "like", "happiness", and "dislike".

The verbal feature extraction unit 44 classifies the intentions of utterances into one of multiple dialog acts based on the text represented by text data. The dialog acts are obtained by abstraction and classification of the intentions of speakers that are expressed by utterances. Multiple dialog acts are predefined, and each dialog act is assigned a label. The verbal feature extraction unit 44 uses labels corresponding to text as one of the parameters indicating a verbal feature. The verbal feature extraction unit 44 may provide text or a part of text to a classifier implemented by a learning model obtained by supervised learning to acquire, from the classifier, dialog acts corresponding to the text. Dialog acts include, for example, "providing information", "confirmation" and "greeting". The verbal feature extraction unit 44 may use a commonly known learning model for classifying dialog acts. For example, as commonly known learning models, the learning models described in Reference Documents 1 to 3 may be used. [Reference Document 1] Ryuichiro Higashinaka, et al., "Towards an open-domain conversational system fully based on natural language processing", In Proceedings of 25th International Conference on Computational Linguistics, pp. 928-939, 2014.
[Reference Document 2] JP 2014-222399 A
[Reference Document 3] JP 2015-045915 A The verbal feature extraction unit 44 acquires a topic indicating a subject or a focal point of an utterance based on the text represented by text data. The verbal feature extraction unit 44 uses the topic (category) of an utterance as one of the parameters indicating a verbal feature. As with the classification of dialog acts corresponding to text, the verbal feature extraction unit 44 may provide text or a part of text to a classifier implemented by a learning model obtained by supervised learning to acquire, from the classifier, the topics of utterances. As commonly known learning models for classifying the topics of utterances, it is possible to use the learning models described in Reference Documents 1 to 3.

The verbal feature extraction unit 44 performs dependency analysis on the text represented by the text data to acquire the number of occurrences of dependencies. The verbal feature extraction unit 44 detects dependencies by analyzing the modification relationships between words included in the text. For the analysis of modification relationships between words, it is possible to use an analyzer implemented by a pre-trained learning model (SVM, GMM, HMM, NN, etc.). When a trained analyzer is used, the verbal feature extraction unit 44 acquires the number of occurrences of dependencies by applying the text data to the analyzer. The verbal feature extraction unit 44 uses the number of occurrences of dependencies detected in the text as one of the verbal features. The verbal feature extraction unit 44 may use dependency information indicating combinations of words having modification relationships as one of the parameters indicating a verbal feature.

The verbal feature extraction unit 44 uses a specific-expression dictionary, in which specific expressions are recorded, to determine whether specific expressions are included in the text indicated by the text data. The specific expressions include proper nouns and expressions indicating dates, times, and quantities. Proper nouns include the names of people, cities, geographical areas, countries, books, songs, and the like. The verbal feature extraction unit 44 counts the number of occurrences of specific expressions in the text and uses the number of occurrences of the specific expressions as one of the parameters indicating a verbal feature.

Figure 8:
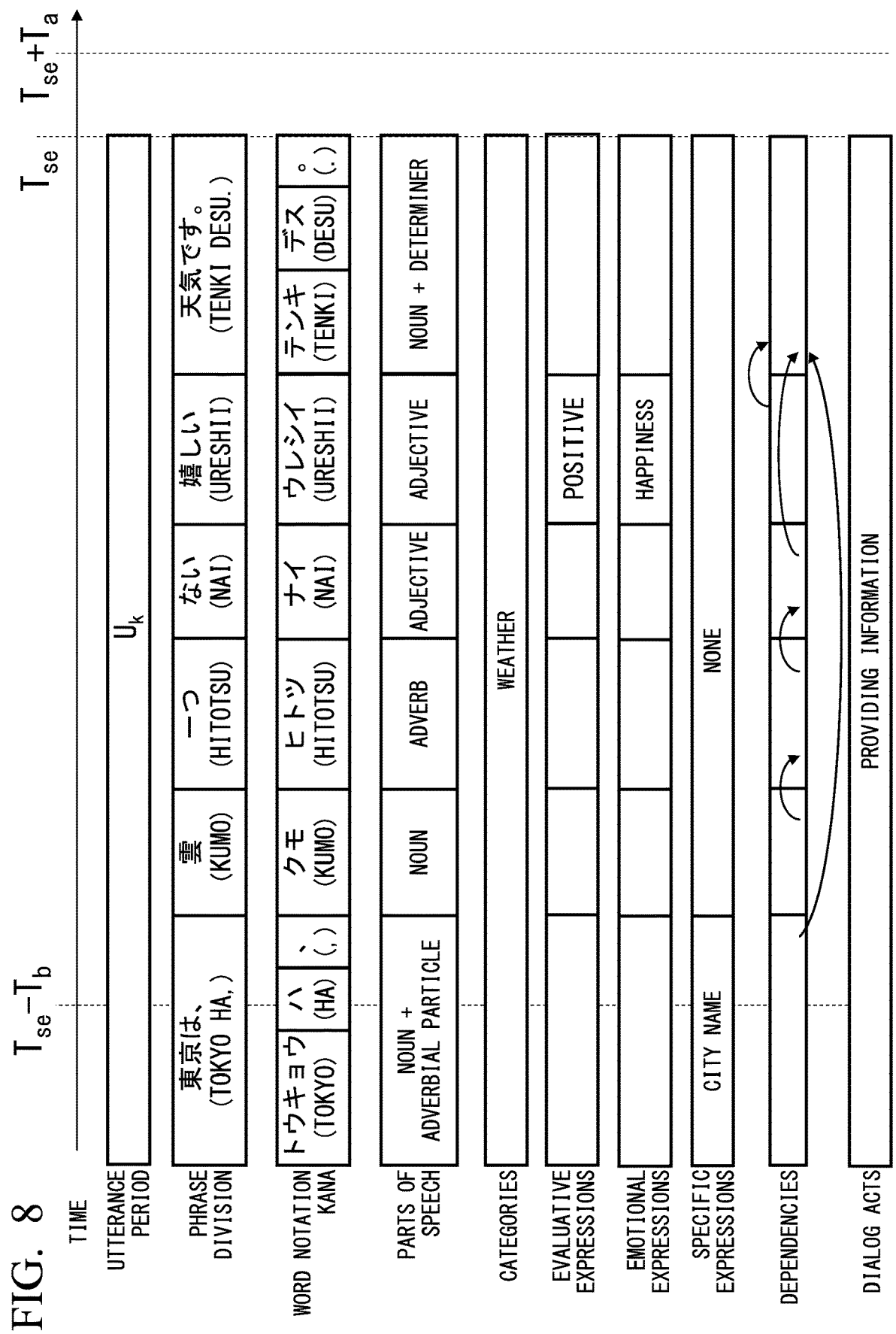
FIG. 8 is a diagram showing an example of a process for extracting verbal feature quantities from text indicating an utterance in an utterance period in the third embodiment.

FIG. 8 is a diagram showing an example of the process for extracting verbal feature quantities from text indicating an utterance in an utterance period $U_k$. From the utterance identified in the utterance period $U_k$ shown in FIG. 8, Japanese text data indicating "Tokyo ha, kumo hitotsu nai ureshii tenki desu. (It is delightful weather with no clouds in Tokyo.)" is acquired. The verbal feature extraction unit 44 performs morphological analysis and dependency analysis on the text data. The verbal feature extraction unit 44 acquires the words, "Tokyo", "ha", ",", "kumo", "hitotsu", "nai", "ureshii", "tenki", "desu" and ".". The verbal feature extraction unit 44 may use Japanese kana character notation for the text representing each word.

The verbal feature extraction unit 44 classifies the text indicated by the above-mentioned text data into units of clauses, and acquires the parts of speech in each clause. The parts of speech are acquired based on the morphological analysis results of the text data. The verbal feature extraction unit 44 obtains, as parts of speech in text, "nouns+adverbial particles", "nouns", "adverbs", "adjectives", "adjectives", and "nouns+determiners". The verbal feature extraction unit 44 may, for example, acquire parts of speech included in the text by applying the text data to the analyzer described in Reference Document 4.

[Reference Document 4] Takeshi Fuchi and Shinichiro Takagi, "Japanese morphological analyzer using word Co-occurrence -Jtag-", In Proceedings of International Conference on Computational Linguistics, pages 409-413, 1998.

The verbal feature extraction unit 44 acquires, from the text data, the category "weather", the evaluative expression "positive", the emotional expression "happiness", the specific expression "city name", and the dialog act "providing information". Additionally, the verbal feature extraction unit 44 acquires dependency information indicating ("Tokyo ha", "tenki desu"), ("kumo", "hitotsu"), ("hitotsu", "nai"), ("nai", "tenki desu"), and ("ureshii", "tenki desu"). The dependency information may, instead of a combination of phrases, indicate a combination of positions of occurrence of phrases in the text. When using a combination of the positions of occurrence of phrases as dependency information, the dependency information indicates (1, 6), (2, 3), (3, 4), (4, 6) and (5, 6).

As feature quantities including the number of occurrences of parts of speech, the number of occurrences of evaluative expressions, the number of occurrences of emotional expressions, labels for dialog acts, utterance categories (topics), the number of occurrences of dependencies, and the number of occurrences of specific expressions, the verbal feature extraction unit 44 extracts, from the text shown in FIG. 8, (8, 1, 1, providing information, weather, 5, 1).

The verbal feature extraction unit 44 generates a list including, as elements, the number of occurrences of parts of speech, the number of occurrences of evaluative expressions, the number of occurrences of emotional expressions, labels for dialog acts, utterance categories (topics), the number of occurrences of dependencies, and the number of occurrences of specific expressions. A feature indicated by the parameters indicating verbal features is represented by $f_w$, and a feature quantity indicated as a statistical quantity of the parameters indicating verbal features is represented by $f_{a,w}$ (hereinafter referred to as the verbal feature quantity $f_{a,w}$). This verbal feature quantity $f_{a,w}$ is computed for each participant $P_a$ by using the feature quantity $f_w$. As the statistical quantities of the parameters indicating verbal features, the mean value, the mode value, and the standard deviation of the numbers of occurrences are used, and the labels and topics with the largest number of occurrences are used. The verbal feature extraction unit 44 computes the verbal feature quantities $f_{a,w}$ for each participant $P_a$ from the generated list, thereby extracting the verbal feature quantities $f_{a,w}$ of the participants $P_a$ from the linked audio information stored in the storage unit 14.

Since the verbal feature quantities $f_{a,w}$ are extracted for each utterance, verbal feature quantities $f_{a,w}$ are not extracted for participants (non-speakers) other than the current speaker in each utterance period. As a verbal feature quantity $f_{a,w}$ for a non-speaker, a prescribed value indicating that the participant $P_a$ is a non-speaker may be set.

The skill estimation unit 46 acquires participatory roles assigned, by the participatory role assignment unit 18, to each participant for each utterance period, non-verbal feature quantities extracted by the non-verbal feature extraction unit 42, and verbal feature quantities extracted by the verbal feature extraction unit 44. The skill estimation unit 46 estimates the communication skill of each participant on the basis of the combination of the participatory role, non-verbal feature quantities and verbal feature quantities that have been acquired. The output unit 48 outputs, to the outside of the communication skill evaluation device 10C, the estimation result for each participant estimated by the skill estimation unit 46. The output unit 48 may store the estimation results of each participant in the storage unit 14.

In order to estimate communication skill, a machine learning model implemented by supervised learning using a training data set including data items combining participatory roles, non-verbal feature quantities, verbal feature quantities, and skill assessment values is used. As the machine learning model, any one of SVM, GMM, HMM, NN, or RNN (Recurrent Neural Network) may be used. The training data set is generated by combining, with the skill assessment value of each participant in a conversation, the participatory role, non-verbal feature quantities, and verbal feature quantities obtained from the linked audio information of the conversation and the linked measurement information of the same conversation. The skill assessment value of each participant is obtained by the evaluation criteria described in the aforementioned Reference Documents A and B, or by other evaluation criteria.

The machine learning of the model is performed on a computer system. For example, the computer system applies the participatory roles, non-verbal feature quantities, and verbal feature quantities included in the training data set to the model, and updates the parameters in the model so as to minimize the differences between the skill assessment values output by the model and the skill assessment value included in the training data set. The computer system repeatedly updates the parameters in the model until prescribed conditions are satisfied using the training data set. The prescribed conditions are defined by using the number of repetitions, threshold values for the differences, or the like. The skill estimation unit 46 has a trained model as an evaluator. As the skill assessment values included in the training data and the skill assessment values output by the model, it is possible to use, for example, labels assigned to classes indicating communication skill evaluation results, or numerical values in a prescribed range. The labels assigned to classes indicating evaluation results include "fair", "good", "very good", "excellent", etc., and the prescribed range is defined as the range from 1 to 100.

The skill estimation unit 46 selects one of the participants in a conversation as an evaluation target, and inputs, into the trained model (evaluator), a participatory role, verbal feature quantities, and non-verbal feature quantities corresponding to the selected participant. The skill estimation unit 46 acquires a skill assessment value output by the evaluator as an assessment value representing the communication skill of the selected participant.

Figure 9:
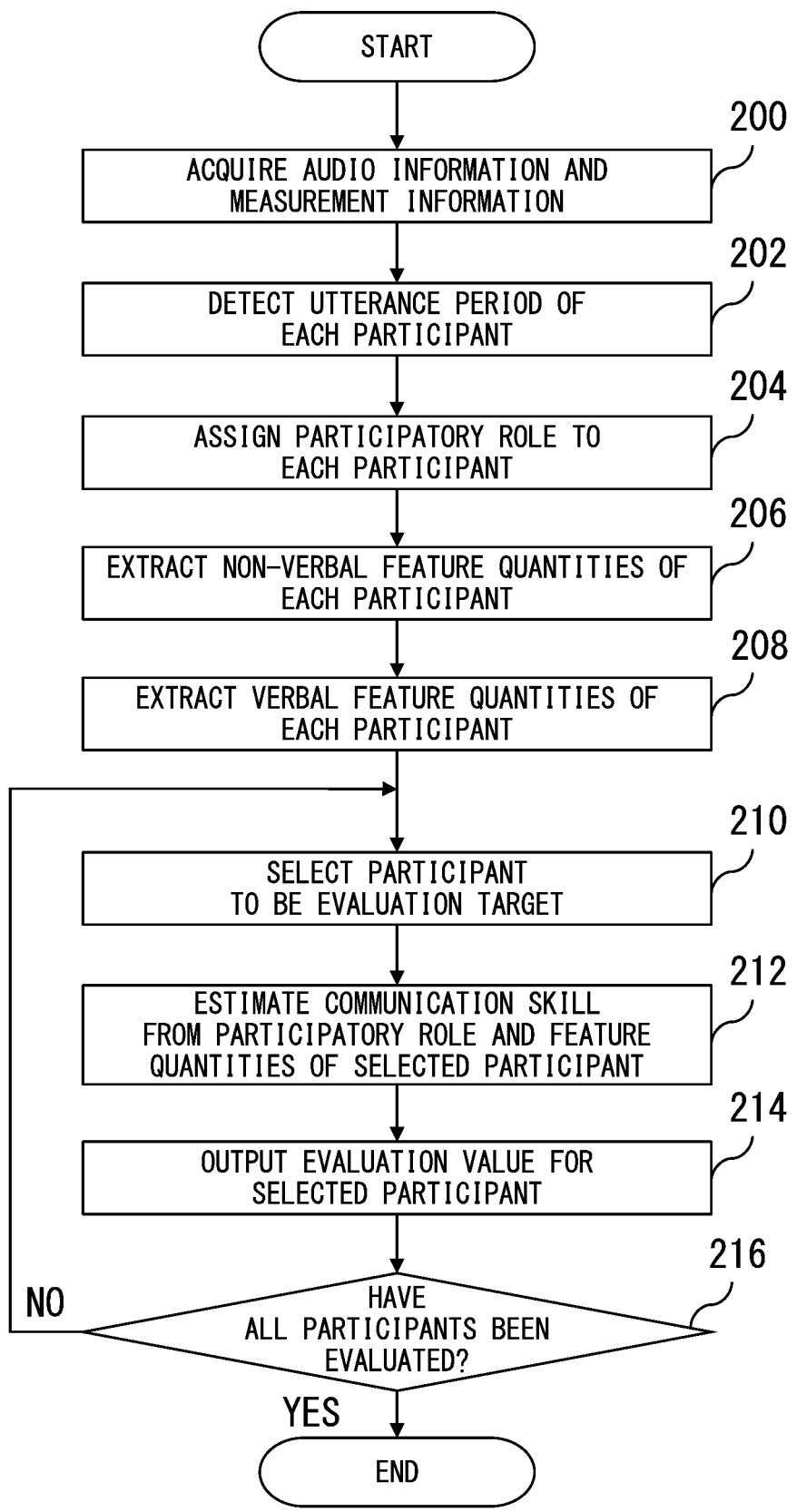
FIG. 9 is a flowchart showing an example of the functions performed by the communication skill evaluation device in the third embodiment.

FIG. 9 is a flowchart showing an example of the functions performed by the communication skill evaluation device 10C according to the third embodiment. In Step 200 in FIG. 9, the receiving unit 12 acquires audio information of a conversation by participants from audio input devices 30 worn by the participants, and acquires measurement information for the participants in the conversation from measurement devices 32 worn by the participants. The receiving unit 12 causes the storage unit 14 to store linked audio information in which participants are linked to the audio information, and linked measurement information in which participants are linked to the measurement information.

In Step 202, the utterance period detection unit 16 detects utterance periods defined by the starting and ending times of utterances based on the linked audio information stored in the storage unit 14, and the participants who spoke in each utterance period.

In Step 204, the participatory role assignment unit 18 defines, as an utterance pair, two utterances obtained in chronological order from the utterance periods detected in Step 202, and for each utterance pair, assigns a participatory role to each participant. The participatory roles in the third embodiment are the same as the participatory roles in the first and second embodiments.

In Step 206, the non-verbal feature extraction unit 42 extracts feature quantities relating to non-verbal actions by the participants at the ends of the utterances in the respective utterance periods based on the linked measurement information stored in the storage unit 14. From the extracted feature quantities, the non-verbal feature extraction unit 42 generates a non-verbal feature quantity for each participant.

In Step 208, the verbal feature extraction unit 44 extracts parameters indicating the verbal features of each utterance based on the linked audio information stored in the storage unit 14. The verbal feature extraction unit 44 generates a verbal feature quantity for each participant based on the parameters extracted for each utterance.

In Step 210, the skill estimation unit 46 selects a participant who is to be an evaluation target from among participants designated by a user selection operation.

In Step 212, the skill estimation unit 46 inputs, to a trained evaluator, a combination of the participatory role, the non-verbal feature quantities and the verbal feature quantities of the participant selected as the evaluation target, for each utterance period. The skill estimation unit 46 acquires the output of the evaluator as an assessment value representing the communication skill of the selected participant.

In Step 214, the output unit 48 outputs the assessment value acquired by the skill estimation unit 46.

In Step 216, the skill estimation unit 46 determines whether or not all of the participants designated by the user selection operation have been evaluated. If there is a participant who has not been evaluated (Step 216: NO), then the skill estimation unit 46 returns the process to Step 210, and repeatedly performs the functions in Steps 210 to 216. If all of the participants have been evaluated (Step 216: YES), then the communication skill evaluation device 10C ends the process.

The communication skill evaluation system 94 in the third embodiment can improve the accuracy of estimation of the communication skill of each participant by using verbal feature quantities relating to each utterance in addition to the participatory role and the feature quantities relating to multiple non-verbal actions.

When acquiring the communication skill assessment values of the participants, if there are feature quantities that cannot be acquired among the feature quantities relating to gaze actions, head movements, respiratory movements, and mouth shape changes included in the non-verbal feature quantities, the skill estimation unit 46 may input, to the trained model, prescribed values instead of the feature quantities that were not acquired. As the prescribed values, it is possible to use, for example, a value such as the median value in the range of the feature quantity that was not acquired, or the mode value, the mean value, the minimum value, or the like of the feature quantities in the training data.

Additionally, a trained model may be provided for each combination of feature quantities for gaze actions, head movements, respiratory movements and mouth shape changes included among the non-verbal feature quantities. The skill estimation unit 46 may acquire an assessment value by using a learned model corresponding to an effective combination of feature quantities included in the acquired non-verbal feature quantities.

Due to the skill estimation unit 46 performing the above-mentioned functions, the communication skill evaluation system 94 can estimate the communication skill of a participant even if some of the non-verbal feature quantities cannot be acquired.

As verbal feature quantities, it is also possible to use parameters other than the number of occurrences of parts of speech, the number of occurrences of evaluative expressions, the number of occurrences of emotional expressions, labels for dialog acts, utterance categories (topics), the number of occurrences of dependencies, and the number of occurrence of specific expressions. For example, the verbal feature extraction unit 44 may extract written words, sensory expressions, onomatopoeia, number of characters, positions, and thesauruses for each morpheme obtained from text represented by text data. Additionally, the verbal feature extraction unit 44 may extract the parameters in each phrase, or may extract the parameters in units other than words and phrases. Additionally, when the utterances are in Japanese, the verbal feature extraction unit 44 may extract parameters for each character in the text.

The communication skill evaluation device 10C may generate and use other non-verbal feature quantities from the linked measurement information from conversations and the text indicating utterances. For example, the communication skill evaluation device 10C may extract whether or not a participant has performed a nodding action as another non-verbal feature quantity. As the estimator for estimating whether or not a participant has nodded, it is possible to use a machine learning model using a decision tree algorithm. The model of the estimator takes, as inputs, the number of characters in phrases obtained from the text, the positions of phrases in the text, word information relating to words contained in phrases, and dialog actions obtained from text, and outputs whether or not the participant has nodded. The word information indicates pronunciation and parts of speech in words. Such an estimator may, for example, be implemented on the basis of the technologies described in Reference Documents 1 and 4 to 6.

[Reference Document 5] J. R. Quinlan, "Improved use of continuous attributes in c4.5", Journal of Artificial Intelligence Research 4, pp. 77-90, 1996.

[Reference Document 6] Toyomi Meguro, Ryuichiro Higashinaka, Yasuhiro Minami, and Kohji Dohsaka, "Controlling listening-oriented dialogue using partially observable Markov decision processes", In Proceedings of the 23rd International Conference on Computational Linguistics, pp. 761-769, 2010.

Fourth Embodiment

A next-speaker estimation system 96 according to the fourth embodiment estimates, in a conversation among participants, a participant who is to speak next when an utterance by one of the participants has ended. Additionally, the next-speaker estimation system 96 estimates the timing at which the participant who has been estimated to be the next speaker will start to speak. In a conversation among participants, there is a strong correlation between features relating to non-verbal actions of the participants before and after an utterance ends, and the participant who will speak next. The next-speaker estimation system 96 estimates the participant who will speak next on the basis of this correlation.

The estimation of the participant who will speak next is performed by using a probability model as the machine learning model. However, the model used to estimate the participant who will speak next is not limited to being a probability model, and other models may be used. Additionally, the conversations handled in the fourth embodiment include not only conversations among participants who are meeting face-to-face, but also conversations using communication means such as a videophone or a video chat. The number of participants in a conversation is not particularly restricted as long as there are two or more.

Figure 10:
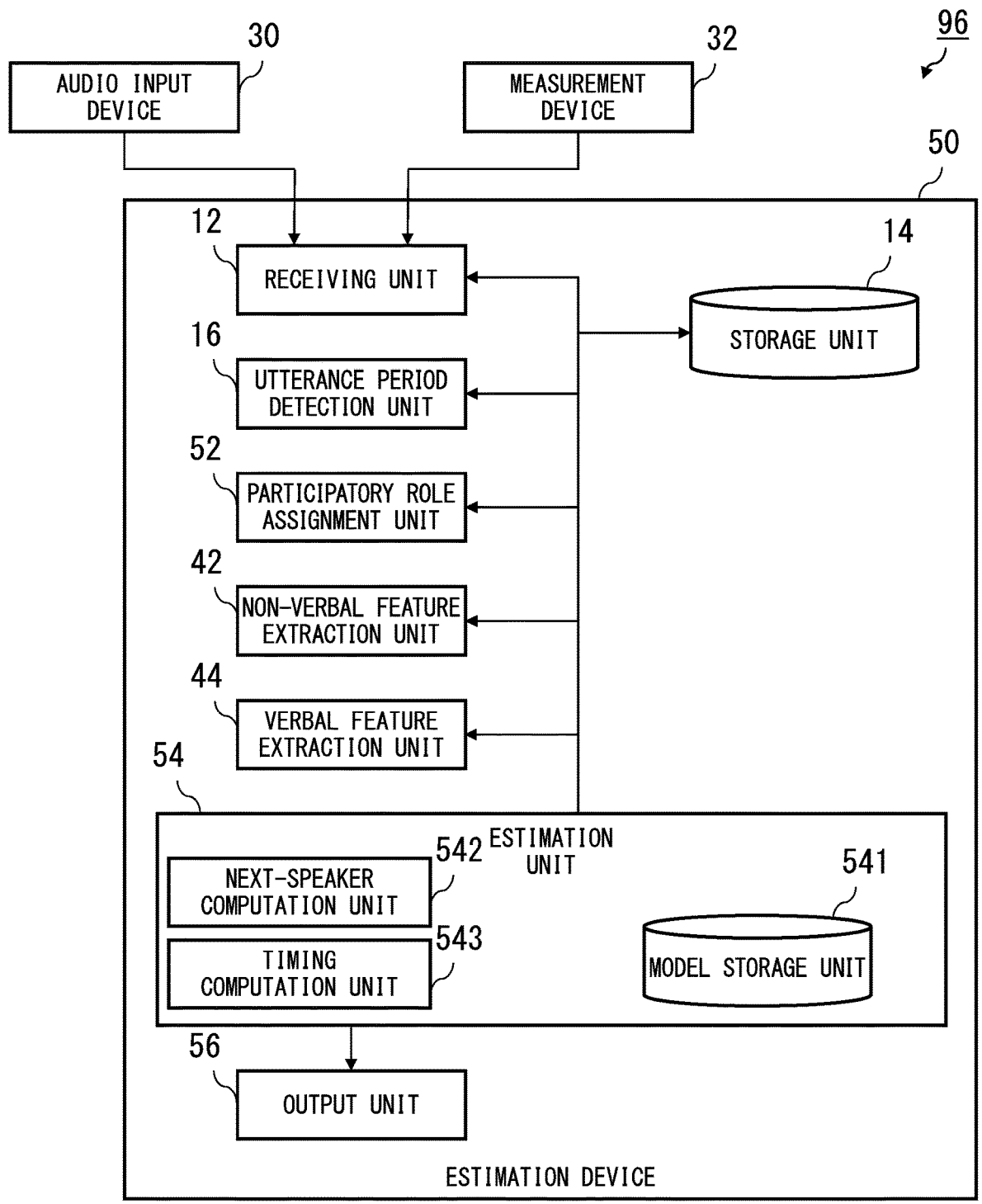
FIG. 10 is a diagram showing an example of the structure of a next-speaker estimation system in a fourth embodiment.

FIG. 10 is a diagram showing an example of the configuration of the next-speaker estimation system 96 in the fourth embodiment. The next-speaker estimation system 96 includes an audio input device 30, a measurement device 32, and an estimation device 50. The audio input device 30 and the measurement device 32 in the fourth embodiment have configurations and perform actions that are similar to the audio input device 30 and the measurement device 32 in the first and second embodiments, respectively.

The estimation device 50 includes a receiving unit 12, a storage unit 14, an utterance period detection unit 16, a participatory role assignment unit 52, a non-verbal feature extraction unit 42, a verbal feature extraction unit 44, an estimation unit 54, and an output unit 56. The receiving unit 12, the storage unit 14, and the participatory role assignment unit 18 in the fourth embodiment perform functions similar to those of the receiving unit 12, the storage unit 14, and the participatory role assignment unit 18 in the first embodiment, respectively.

The non-verbal feature extraction unit 42 and the verbal feature extraction unit 44 in the fourth embodiment perform functions similar to those of the non-verbal feature extraction unit 42 and the verbal feature extraction unit 44 in the third embodiment, respectively. However, the non-verbal feature extraction unit 42 in the fourth embodiment uses the label S, the label $L_q$ and the label X, explained in the first embodiment, in the extraction of gaze target transition patterns. In other words, the non-verbal feature extraction unit 42 in the fourth embodiment extracts gaze target transition patterns without using the label N indicating a gaze at the next speaker when there is a speaker change. Additionally, the non-verbal feature extraction unit 42 supplies, to the estimation unit 54, the times $t_{2,j}$ at which the gaze target of the participant $P_j$ (j=1, 2, ..., A) changed. If there is no change in the gaze target during the period from the time $T_{se}-T_b$ to the utterance ending time $T_{se}+T_a$, the non-verbal feature extraction unit 42 does not supply times $t_{2,j}$ to the estimation unit 54.

The participatory role assignment unit 52 assigns, to each participant, one of two participatory roles: (1) a speaker during an utterance at the current time; and (2) a non-speaker during an utterance at the current time.

The estimation unit 54 includes a model storage unit 541, a next-speaker computation unit 542, and a timing computation unit 543. The model storage unit 541 stores two probability models for estimating the next speaker and three probability models for estimating the timing at which the next utterance will start. For the estimation of the next speaker, a first next-speaker estimation model and a second next-speaker estimation model are used. For the estimation of the next utterance starting timing, a first utterance starting time model, a second utterance starting time model, and a third utterance starting time model are used.

[Estimation of Next Speaker]

The first next-speaker estimation model and the second next-speaker estimation model are models pre-trained with the relationship between the speaker in the next utterance period, and verbal feature quantities and non-verbal feature quantities of the participants in an utterance period. The first next-speaker estimation model represents the probabilities that a speaker continuation and a speaker change will occur when certain verbal feature quantities and non-verbal feature quantities of the participants occur in an utterance period. The second next-speaker estimation model represents the probability that the next speaker will be a participant $P_1$ other than the participant $P_s$, who is the speaker at the current time, when certain verbal feature quantities and non-verbal feature quantities of the participants occur in an utterance period, where i≠s and i=1, 2, ..., A. The first next-speaker estimation model and the second next-speaker estimation model are obtained by statistically calculating, from previously recorded conversations, the probabilities that relationships between the next speaker, and certain verbal feature quantities and non-verbal feature quantities of the participants will occur. Each of the models will be explained below.

The first next-speaker probability model includes five probabilities. The first probability is the probability $P(f_s|tt)$ of occurrence of a feature pattern $f_s$ combining the verbal feature quantities and the non-verbal feature quantities of a participant $P_s$ who is the speaker at the time of a speaker change. The second probability is the probability $P(f_r|ntt)$ of occurrence of a feature pattern $f_r$ combining the verbal feature quantities and the non-verbal feature quantities of a speaker at the time of a speaker continuation. The third probability is the probability $P(f_{\phi(r)}|tt)$ of occurrence of a feature pattern $f_{\phi(r)}$ including the non-verbal feature quantities of a participant $P_r$ who is a non-speaker at the time of a speaker change, where r=1, ..., A−1. The fourth probability is the probability $P(f_{\phi(r)}|ntt)$ of occurrence of a feature pattern $f_{\phi(r)}$ including the non-verbal feature quantities of a non-speaker at the time of a speaker continuation. The fifth probability is the probability $P(tt)$ that a speaker change will occur. The term 'tt' is a label representing a speaker change, the term 'ntt' is a label representing a speaker continuation, $P(\alpha)$ represents the prior probability that a will occur, and $P(\alpha|\beta)$ represents the posterior probability that a will occur when β has occurred.

The second next-speaker probability model indicates the probability that a participant $P_i$ (i≠s, i=1, 2, ..., A) will be the next speaker in accordance with certain verbal feature quantities and non-verbal feature quantities. Specifically, the second next-speaker probability model includes two probabilities. The first probability is the probability $P(ns_i|f_s)$ that the participant $P_i$ will be the next speaker based on a feature pattern $f_s$ combining verbal feature quantities and non-verbal feature quantities of the speaker. The second probability is the probability $P(ns_i|f_{\phi(r)})$ that the participant $P_i$ will be the next speaker based on a feature pattern $f_{\phi(r)}$ of a non-speaker. The term 'ns,' is a label indicating that the next speaker will be the participant $P_i$, who is a non-speaker.

The next-speaker computation unit 542 acquires a non-verbal feature quantity $f_1, \ldots, f_A$ of each participant extracted by the non-verbal feature extraction unit 42, and acquires a verbal feature quantity $f_w$ extracted by the verbal feature extraction unit 44. The non-verbal feature quantities $f_1, \ldots, f_A$ include gaze feature quantities $f_{a,g}$, head movement feature quantities $f_{a,h}$, respiratory movement feature quantities $f_{a,r}$ and mouth shape feature quantities $f_{a,m}$ respectively indicating feature quantities for the gaze actions, head movements, respiratory movements and mouth shape changes of each participant $P_a$. The next-speaker computation unit 542 provides the non-verbal feature quantities $f_1, \ldots, f_A$ and the verbal feature quantity $f_w$ to the first next-speaker probability model, and obtains the output from the first next-speaker probability model as next-speaker estimation information. The next-speaker computation unit 542 estimates the next speaker on the basis of the next-speaker estimation information. Specifically, the next-speaker computation unit 542 determines whether the speaker will change or whether the speaker will continue. If it is determined that the speaker will change, then the next-speaker computation unit 542 determines which of the participants will be the next speaker.

The determination of whether a speaker change will occur will be explained. In the fourth embodiment, the next-speaker computation unit 542 assumes that the non-verbal actions of each participant $P_i$ are independently occurring phenomena, and uses a simple probability model to determine whether or not a speaker change will occur. The probability $P(tt|f_s, f_{\varphi(1)}, \ldots, f_{\varphi(A-1)})$ that the speaker will change and the probability $P(ntt|f_s, f_{\varphi(1)}, \ldots, f_{\varphi(A-1)})$ that the speaker will continue are computed by Expressions (1) and (2). The next-speaker estimation information includes the probabilities computed by Expressions (1) and (2).

[Math. 1]

$$P(tt|f_s,f_{\varphi(1)}, \ldots, f_{\varphi(A-1)}) \propto P(tt) \times P(f_s|tt) \times \Pi_{r=1}^{A-1} P(f_{\varphi(r)}|tt) \quad (1)$$

[Math. 2]

$$P(ntt|f_s,f_{\varphi(1)}, \ldots, f_{\varphi(A-1)}) \propto P(ntt) \times P(f_s|ntt) \times \Pi_{r=1}^{A-1} P(f_{\varphi(r)}|ntt) \quad (2)$$

In Expressions (1) and (2), $P(tt)$ and $P(ntt)=1-P(tt)$ are models stored in the model storage unit 541. Additionally, $P(f_s|tt)$, $P(f_s|ntt)$, $P(f_{\varphi(r)}|tt)$, and $P(f_{\varphi(r)}|ntt)$ in Expressions (1) and (2) are models that are stored in the model storage unit 541 and that correspond to the non-verbal feature quantities $f_1, \ldots, f_A$ and the verbal feature quantity $f_w$.

The next-speaker computation unit 542 uses the probabilities $P(tt|f_s, f_{\varphi(1)}, \ldots, f_{\varphi(A-1)})$ and $P(ntt|f_s, f_{\varphi(1)}, \ldots, f_{\varphi(A-1)})$ computed by Expressions (1) and (2) to determine whether a speaker change or a speaker continuation will occur.

For example, when Expression (3) is satisfied, the next-speaker computation unit 542 determines that there will be a speaker change. When Expression (3) is not satisfied, it determines that there will be a speaker continuation.

$$P(tt|f_s,f_{\varphi(1)}, \ldots, f_{\varphi(A-1)}) > P(ntt|f_s,f_{\varphi(1)}, \ldots, f_{\varphi(A-1)}) \quad (3)$$

Additionally, when Expression (4) including the coefficient $\gamma$ (where $\gamma \neq 0$) and $\delta$ that are constants is satisfied, the next-speaker computation unit 542 determines that there will be a speaker change. When Expression (4) is not satisfied, it determines that there will be a speaker continuation.

$$P(tt|f_s,f_{\varphi(1)}, \ldots, f_{\varphi(A-1)}) > \gamma \times P(ntt|f_s,f_{\varphi(1)}, \ldots, f_{\varphi(A-1)}) + \delta \quad (4)$$

If it is determined that the speaker will continue, then the next-speaker computation unit 542 outputs the label ns indicating that the current speaker (participant $P_s$) will be the next speaker.

If it is determined that the speaker will change, then the next-speaker computation unit 542 determines which of the participants will be the next speaker. It is assumed that the non-verbal actions of the participants $P_1, \ldots, P_A$ are independently occurring phenomena. The next-speaker computation unit 542 computes, by means of Expression (5), the probability $P(ns_i)$ that the participant $U_i$, who is a non-speaker at the current time, will be the next speaker.

[Math. 3]

$$P(ns_i)=P(ns_i|f_s) \times \Pi_{r=1}^{A-1} P(ns_i|f_{\varphi(r)}) \quad (5)$$

$P(ns_i|f_s)$ and $P(ns_i|f_{\varphi(r)})$ in Expression 5 are stored in the model storage unit 541, and correspond to the non-verbal feature quantities $f_1, \ldots, f_A$ and the verbal feature quantity $f_w$.

The next-speaker computation unit 542 computes the probability $P(ns_i)$ by means of Expression (5), determines that the participant $P_i$ having the highest probability $P(ns_i)$ will be the next speaker, and outputs a label ns indicating that the next speaker is the participant $U_i$. Additionally, the next-speaker computation unit 542 may determine, as a candidate for being the next speaker, a participant $U_i$ corresponding to a probability $P(ns_i)$ that is a predetermined threshold value or higher, and may output a label indicating the next-speaker candidate. Alternatively, the next-speaker computation unit 542 may determine, as candidates for being the next speaker, participants $U_i$ corresponding to probabilities $P(ns_i)$ selected in descending order from the largest one, and may output labels indicating the next-speaker candidates.

[Estimation of Utterance Starting Timing]

Regarding the estimation of the next utterance starting timing, a first utterance starting time model, a second utterance starting time model, and a third utterance starting time model will be explained. The first utterance starting time model indicates how the verbal feature quantities and the non-verbal feature quantities of the participants in an utterance period relate to the next-utterance starting time with the origin at the utterance period ending time. The second utterance starting time model indicates how the verbal feature quantities and the non-verbal feature quantities of the participants in an utterance period relate to the next-utterance starting time with the origin at the starting time of a gaze action after a transition. The third utterance starting time model indicates the next-utterance starting time with the origin at the ending time of the utterance period. The third utterance starting time model does not depend on patterns indicating the transitions in gaze targets. For example, the third utterance starting time model represents the mean of next-utterance starting times with the origins at the respective ending times of utterance periods (for example, a model indicating the probability distribution of the mean).

The "next-utterance starting time with the origin at a certain time" refers to the utterance starting time relative to the certain time, and in other words, refers to the next-utterance starting time when the certain time is 0. That is, when the absolute time (actual time) corresponding to the certain time is a and the absolute time corresponding to the next-utterance starting time is $\beta$, then the "next-utterance starting time with the origin at a certain time" represents $\beta - \alpha$.

It will be explained the case that the timing computation unit 543 uses the first utterance starting time model, the second utterance starting time model, and the third utterance starting time model. Alternatively, the timing computation unit 543 may use one or more of the three models to estimate the utterance starting timing.

The first utterance starting time model represents a probability distribution of the next-utterance starting time, with the origin at the ending time of an utterance period, depending on the verbal feature quantities and the non-verbal feature quantities of the participants in the utterance period. The second utterance starting time model represents a probability distribution of the next-utterance starting time, with the origin at the starting time of a gaze action, depending on the verbal feature quantities and the non-verbal feature quantities of the participants in the utterance period. The third utterance starting time model represents a probability distribution of the next-utterance starting time, with the origin at the ending time of the utterance period. However, the probability distributions indicated by the first utterance starting time model, the second utterance starting time model, and the third utterance starting time model are not limited thereto.

The first to third utterance starting time models are probability density functions representing probability distributions. In other words, the first utterance starting time model is the probability density function $k_v(t-t_1)$, which represents the probability distribution at the next-utterance starting time $t-t_1$ with the origin at the utterance period ending time $t_1$, associated with a feature pattern v including the verbal feature quantities and the non-verbal feature quantities of the participants in the utterance period. Here, the term 't' represents the absolute time. The second utterance starting time model is the probability density function $g_v(t-t_2)$, which represents the probability distribution at the utterance starting time $t-t_2$ with the origin at the time $t_2$ at which a gaze action started after a transition, associated with a feature pattern v including the verbal feature quantities and the non-verbal feature quantities of the participants in the utterance period.

The probability density functions $k_v(t-t_1)$ and $g_v(t-t_2)$ are generated, for each feature pattern v, with respect to each of four types of states consisting of combinations of two utterance states indicating whether a participant is a speaker or a non-speaker, and two states indicating whether there is a speaker change or a speaker continuation. In other words, four types of probability density functions $k_v(t-t_1)$ and $g_v(t-t_2)$ are generated for each feature pattern v, and the functions are distinct from each other. The timing computation unit 543 determines which among the four states is the state that each participant is in, based on the role assigned by the participatory role assignment unit 52 and the label ns obtained by the next-speaker computation unit 542.

For example, when there is a speaker change, even if the feature pattern $f_1'$ of the speaker $P_1$ and the feature pattern $f_2'$ of the non-speaker $P_2$ are the same, $k_{f1'}(t-t_1)$ corresponding to the feature pattern $f_1'$ and $k_{f2'}(t-t_1)$ corresponding to the feature pattern $f_2'$ are distinct from each other. Similarly, $g_{f1'}(t-t_2)$ corresponding to the feature pattern $f_1'$ and $g_{f2'}(t-t_2)$ corresponding to the feature pattern $f_2'$ are distinct from each other.

Additionally, even if the feature pattern $f_1'$ of the participant $P_1$ at the time of a speaker change and the feature pattern $f_1'$ of the participant $P_1$ at the time of a speaker continuation are the same, the $k_{f1'}(t-t_1)$ corresponding to these feature patterns will be distinct from each other. Similarly, the $g_{f1'}(t-t_2)$ according to these feature patterns $f_1$ will also be distinct from each other.

The third utterance starting time model is a probability density function $h(t-t_1)$ indicating the probability distribution of the next-utterance starting time $t-t_1$ with the origin at the utterance period ending time $t_1$. This probability density function $h(t-t_1)$ represents the probability distribution for all $t-t_1$, regardless of the feature pattern v.

The probability density functions included in the first to third utterance starting time models are collected and generated in advance from the audio information of conversations. These probability density functions may be approximated to various functions (for example, gamma distributions or the like) that are closer to actual distributions.

When the next speaker is estimated by the next-speaker computation unit 542, the timing computation unit 543 acquires the ending time $t_{1,k}$ of the utterance period $U_k$ obtained by the utterance period detection unit 16, the label ns indicating the next speaker obtained by the next-speaker computation unit 542, the feature patterns $f_1', \ldots, f_A'$ of the participants, and the times $t_{2,1}, \ldots, t_{2,A}$ at which gaze actions of the participants started after transitions. The timing computation unit 543 updates the gaze feature quantities $f_{a,g}$ included in the non-verbal feature quantities $f_a$ of the participants extracted by the non-verbal feature extraction unit 42 based on the label ns indicating the next speaker. Specifically, by changing the label $L_q$ indicating the participant who will be the next speaker among the labels $L_q$ included in the gaze feature quantities $f_{a,g}$, the timing computation unit 543 acquires the feature patterns $f_1', \ldots, f_A'$ from the non-verbal feature quantities $f_a$ of the participants. The timing computation unit 543 updates the gaze feature quantity $f_{a,g}$ based on the label ns and estimates an utterance starting timing that reflects a speaker change. The timing computation unit 543 may not update the gaze feature quantities $f_{a,g}$. The timing computation unit 543 uses the feature patterns $f_1', \ldots, f_A'$ of each participant as the feature pattern v.

The timing computation unit 543 provides the ending time $t_{1,k}$, the label ns, the feature patterns $f_1', \ldots, f_A'$ of the participants, and the times $t_{2,1}, \ldots, t_{2,A}$ that have been acquired to the first to third utterance starting time models, and obtains the outputs of the first to third utterance starting time models as utterance starting tuning estimation information. The timing computation unit 543 estimates the next utterance starting timing based on the utterance starting timing estimation information. That is, the non-verbal actions of the participants are thought to have an influence on the utterance timing, so the timing computation unit 543 uses a probability distribution obtained by statistically collecting the times from the ends of utterance periods to the start of the next utterance in accordance with the feature patterns $f_1', \ldots, f_A'$. The timing computation unit 543 estimates the next utterance starting timing based on the obtained probability distribution. The process thereof will be specifically explained below.

The timing computation unit 543 extracts the probability density function $h(t-t_1)$, the probability density functions $k_{f1'}(t-t_1), k_{fA'}(t-t_1)$, and the probability density functions $g_{f1'}(t-t_2), g_{fA'}(t-t_2)$ from the model storage unit 541. The extracted probability density functions k, g correspond to cases in which each of the participants $P_1, \ldots, P_A$ are speakers and cases in which they are non-speakers, when there is a speaker change and when there is a speaker continuation, and the feature patterns $f_1', \ldots, f_A'$. The subscripts $f_1', \ldots, f_A'$ of k and g represent $f_1', \ldots, f_A'$, respectively.

Whether each of the participants $P_1, P_A$ was the speaker or a non-speaker can be identified from the label ns acquired by the timing computation unit 543 during the process in the previous utterance period. Whether there will be a speaker change or a speaker continuation can be identified from the label ns acquired by the timing computation unit 543 during the process in the previous utterance period and the label ns acquired by the timing computation unit 543 during the current process.

The timing computation unit 543 generates a probability density function Ps(t) indicating a mixed distribution from h(t−$t_{1,k}$), $k_{f1'}$(t−$t_{1,k}$), . . . , $k_{fA}$(t−$t_{1,k}$), $g_{f1'}$(t−$t_{2,1}$), . . . , $g_{fA}$(t−$t_{2,A'}$), and h(t−$t_1$) obtained by substituting the ending time $t_{1,k}$ of the utterance period $U_k$ and the times $t_{2,1}$, . . . , $t_{2,A}$ at which the gaze actions started after transitions into the extracted h(t−$t_1$), $k_{f1'}$(t−$t_1$), . . . , $k_{fA}$(t−$t_1$), and $g_{f1'}$(t−$t_2$), . . . , $g_{fA}$(t−$t_2$). The timing computation unit 543 defines a time t corresponding to the peak of the generated probability density function Ps(t) as an utterance starting timing. If the time $t_{2,j}$ is not generated by the non-verbal feature extraction unit 42, the timing computation unit 543 defines $g_{fj}$(t−$t_{2,j}$)=1. The utterance starting timing estimation information includes the probability density function Ps(t). The probability density function Ps(t) can be computed, for example, from the following Expression (6).

[Math. 4]

$$Ps(t) = h(t - t_{1,k}) \times \sum_{j=1}^{A} k_{f_j}, (t - t_{1,k}) \times g_{f_j}, (t - t_{2,j}) \quad (6)$$

The timing computation unit 543 determines the next utterance starting timing to be the time t at which Ps(t) is maximum. The timing computation unit 543 outputs, as the utterance starting timing information, a label $T_{ub}$ indicating the time t (next-utterance generation time) that has been determined to be the utterance starting timing. Additionally, the timing computation unit 543 may identify, as a candidate for the next-utterance generation time, a time t corresponding to a probability Ps(t) that is a predetermined threshold value or higher, and may output a label indicating a candidate for the utterance generation time. Alternatively, the timing computation unit 543 may identify, as candidates for the next-utterance generation time, times t corresponding to probabilities Ps(t) selected in descending order from the largest one, and may output labels indicating the candidates for the utterance generation time.

The output unit 56 outputs, as estimation results, to the outside of the estimation device 50, the label ns indicating the next speaker computed by the next-speaker computation unit 542, and the label $T_{ub}$ indicating the next-utterance starting time computed by the timing computation unit 543, in the estimation unit 54. The output unit 56 may store the estimation results in the storage unit 14.

Figure 11:
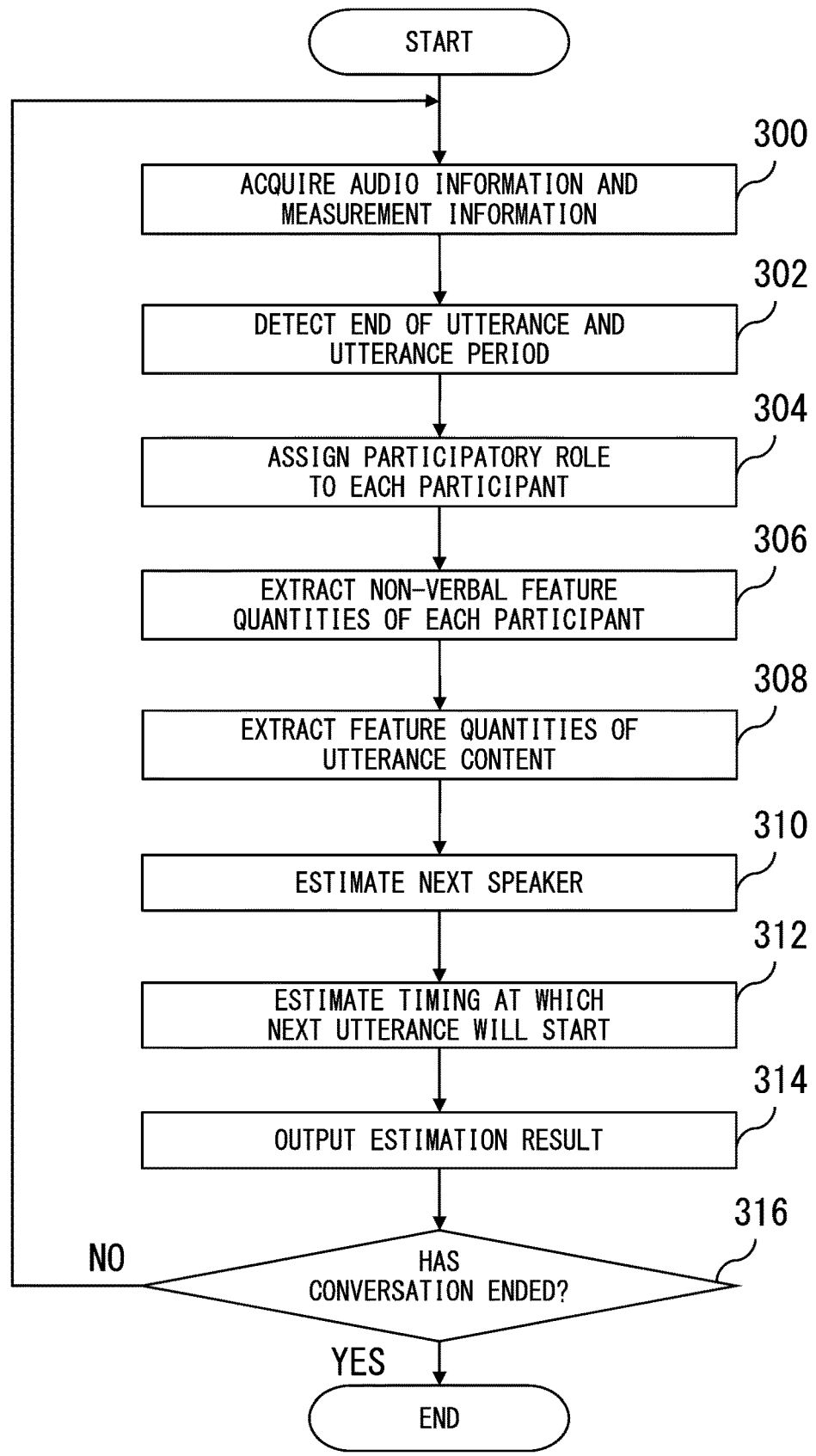
FIG. 11 is a flowchart showing an example of the functions performed by an estimation device in the fourth embodiment.

FIG. 11 is a flowchart showing an example of the functions performed by the estimation device 50 according to the fourth embodiment. The functions in Steps 300 to 316 in FIG. 11 are performed each time an utterance ends during a conversation, and are repeatedly performed until the conversation ends.

In Step 300 in FIG. 11, the receiving unit 12 acquires audio information for a conversation by participants from audio input devices 30 worn by the participants, and acquires measurement information for the participants in the conversation from measurement devices 32 worn by the participants. The receiving unit 12 causes the storage unit 14 to store linked audio information in which participants are linked to the audio information, and linked measurement information in which participants are linked to the measurement information.

In Step 302, the utterance period detection unit 16 detects that an utterance has ended based on the linked audio information stored in the storage unit 14, and detects an utterance period defined by the starting and ending times of the utterance, and the participant who spoke.

In Step 304, the participatory role assignment unit 52 assigns a participatory role to each participant in the utterance period detected by the utterance period detection unit 16.

In Step 306, the non-verbal feature extraction unit 42 extracts feature quantities relating to non-verbal actions by the participants at the end of the utterance in the utterance period based on the linked measurement information stored in the storage unit 14. From the extracted feature quantities, the non-verbal feature extraction unit 42 generates a non-verbal feature quantity for each participant.

In Step 308, the verbal feature extraction unit 44 extracts parameters indicating the verbal features of the utterance content based on the linked audio information stored in the storage unit 14. The verbal feature extraction unit 44 generates a verbal feature quantity for the utterance content in the utterance period based on the parameters of extracted utterance.

In Step 310, the next-speaker computation unit 542 provides, to the first and second next-speaker probability models, the participatory roles and the non-verbal feature quantities of the participants during the utterance period and the verbal feature quantities relating to the utterance. The next-speaker computation unit 542 estimates the next speaker based on the outputs of the first and second next-speaker probability models, and outputs the label ns indicating the next speaker.

In Step 312, the timing computation unit 543 estimates the next utterance starting timing on the basis of the participatory roles and the non-verbal feature quantities of the participants during the utterance period, the verbal feature quantities relating to the utterance, the label ns obtained by means of the next-speaker computation unit 542, and the times $t_{2,j}$ at which the gaze targets of the participants changed. The timing computation unit 543 outputs the label $T_{ub}$ indicating the estimated utterance starting timing.

In Step 314, the output unit 56 outputs, as the estimation results, the label ns indicating the next speaker output from the next-speaker computation unit 542 and the label $T_{ub}$ output from the timing computation unit 543.

In Step 316, the process returns to Step 300 if the conversation has not ended. If the conversation has ended, then the estimation device 50 ends the process. The ending of a conversation may, for example, be determined in accordance with whether or not the receiving unit 12 has received new audio information from the participants.

The next-speaker estimation system 96 in the fourth embodiment can improve the estimation accuracy of the next speaker and the utterance starting timing by using feature quantities relating to multiple non-verbal actions and verbal feature quantities based on utterance content.

Additionally, by using the next-speaker estimation system 96, it is possible to ensure the automation of operations to direct a camera towards a participant who is to speak next during a video conference in which many people are participating.

The next-speaker estimation system according to the fourth embodiment may also be expressed as below.

A next-speaker estimation system comprising: an audio input device that inputs audio information of participants during a conversation;

a measurement device that measures non-verbal actions of each of the participants during the conversation;

an utterance period detection unit that detects, based on the audio information input by the audio input device, an utterance period defined by a starting and an ending of an utterance, and the participant who uttered;

a participatory role assignment unit that assigns either speaker or non-speaker as the role of each participant in the utterance period detected by the utterance period detection unit;

a non-verbal feature extraction unit that extracts a feature quantity for the non-verbal actions of each participant from the results of the measurements of each participant during the utterance period;

a verbal feature extraction unit that extracts a verbal feature quantity indicating a verbal feature for the utterance in the utterance period detected by the utterance period detection unit; and an estimation unit that, based on the role assigned to each participant, the non-verbal action feature quantity of each participant, and the verbal feature quantity, in the utterance period detected by the utterance period detection unit, estimates at least one of a speaker in the next utterance period after the aforementioned utterance period and the utterance starting timing in the next utterance period.

Regarding the fourth embodiment, the case in which the timing computation unit 543 uses the times $t_{2,j}$ at which the gaze targets of the participants changed to estimate the utterance starting timing. The timing computation unit 543 may also use, as the times $t_{2,j}$, instead of the times at which the gaze targets changed, the times at which prescribed changes occurred in features relating to other non-verbal actions.

Additionally, regarding the fourth embodiment, it was explained the case in which the next-speaker computation unit 542 and the timing computation unit 543 use feature quantities of gaze actions, head movements, respiratory movements, and mouth shape changes as features relating to the non-verbal actions of each participant. The next-speaker computation unit 542 and the timing computation unit 543 may further use feature quantities for features relating to other non-verbal actions, or may use at least one of gaze actions, head movements, respiratory movements, and mouth shape changes.

The next-speaker computation unit 542 in the fourth embodiment may be used for the next-speaker estimation unit 26 in the second embodiment. In this case, the feature quantity extraction unit 20 in the second embodiment may compute the values of skill determination parameters by using a probability $P(ns_i)$ acquired by the next-speaker computation unit 542 as the next-speaker estimation probability.

For example, when a participant whom the next-speaker computation unit 542 estimated to be the next speaker was the speaker during the next utterance period, the feature quantity extraction unit 20 increments the value of the skill determination parameter of that participant by one point. When the participant estimated to be the next speaker was not a speaker during the next utterance period, the feature quantity extraction unit 20 decrements the value of the skill determination parameter of that participant by one point.

Additionally, when a participant whom the next-speaker computation unit 542 did not estimate to be the next speaker was not the speaker during the next utterance period, the feature quantity extraction unit 20 increments the value of the skill determination parameter of that participant by one point. When a participant not estimated to be the next speaker was the speaker during the next utterance period, the feature quantity extraction unit 20 decrements the value of the skill determination parameter of that participant by one point.

The feature quantity extraction unit 20 can compute the value of the skill determination parameter of each participant in a conversation by updating the value of the skill determination parameter of each participant in this way for each utterance period.

As described above, a communication skill evaluation system, a communication skill evaluation device, a next-speaker estimation system, and an estimation device have been explained as examples of embodiments. The embodiments may be in the form of programs for making a computer function as the units provided in the communication skill evaluation device or the estimation device. The embodiments may be in the form of computer-readable storage media in which these programs are stored.

Aside from the above, the structures of the communication skill evaluation device and the estimation device explained in the above-mentioned embodiments are just examples, and may be modified in accordance with the situation within a range not departing from the spirit of the invention.

Additionally, the processing flow in the programs explained in the above-mentioned embodiments are just examples, and it is possible to remove some steps, to add new steps or to change the processing order within a range not departing from the scope of the invention.

Additionally, regarding the above-mentioned embodiments, the cases in which the processing in the embodiments was implemented by a software using a computer by executing a program were explained, but the invention is not limited thereto. The embodiments may, for example, be implemented by a hardware or by combining the hardware with a software.

INDUSTRIAL APPLICABILITY

The present invention can be applied to uses in which it is necessary to evaluate the communication skill of participants in a conversation.

REFERENCE SIGNS LIST 10A, 10B, 10C Communication skill evaluation device
12 Receiving unit
14 Storage unit
16 Utterance period detection unit
18, 52 Participatory role assignment unit
20 Feature extraction unit
22 Estimation unit
24, 48, 56 Output unit
26 Next-speaker estimation unit
30 Audio input device
32 Measurement device
32A Gaze target measurement unit
32B Head movement measurement unit
32C Respiratory movement measurement unit
32D Mouth feature point measurement unit
42 Non-verbal feature extraction unit
44 Verbal feature extraction unit
46 Skill estimation unit
50 Estimation device
54 Estimation unit
90, 92, 94 Communication skill evaluation system
541 Model storage unit
542 Next-speaker computation unit
543 Timing computation unit

The invention claimed is:

1. A communication skill evaluation system comprising:
an audio input device that inputs audio information of participants in a conversation;
a measurement device that measures non-verbal actions of each of the participants during the conversation;
a hardware processor that:
detects, based on the audio information input by the audio input device, an utterance period defined by starting and ending times of each utterance in the conversation, and a participant who spoke in each detected utterance period;
defines, as an utterance pair, two utterances obtained in chronological order from each detected utterance period;
assigns, in accordance with whether or not each of the participants spoke in each defined utterance pair, a participatory role to each of the participants, the participatory role indicating that a participant is one of a current speaker who is speaking when the same speaker is continuing, a non-speaker who is not the current speaker when the same speaker is continuing, a current speaker who stops speaking when the speaker changes, a next speaker who speaks next when the speaker changes, and a non-speaker who is neither the current speaker nor the next speaker when the speaker changes;
extracts, based on measurement results by the measurement device, non-verbal feature quantities for each of the participants, relating to the non-verbal actions at the end of the utterance in each detected utterance period; and
estimates communication skill for each of the participants using a training model and based on a combination, in each detected utterance period, of a predetermined non-verbal feature quantities of the assigned participatory role and the extracted non-verbal feature quantity quantities,
wherein the non-verbal actions are gaze actions, head movements, respiratory movements and mouth shape changes,
where the model is trained using feature quantities for the non-verbal actions and, when the feature quantities cannot be acquired, the model is trained using prescribed values for the feature quantities, such that the prescribed values are derived from training data and are one of a median, a mode value, a mean value or a minimum value of a given feature quantity in the training data.

2. The communication skill evaluation system as in claim 1,
wherein the hardware processor extracts a verbal feature quantity indicating a verbal feature of the utterance in each detected utterance period, and
wherein the hardware processor estimates communication skill for each of the participants based on a combination, in each detected utterance period, of the extracted verbal feature quantity, the assigned participatory role, and the extracted non-verbal feature quantity.

3. The communication skill evaluation system of claim 1, wherein the head movements are based on at least one of a shifting of the head and a turning of the head.

4. The communication skill evaluation system as in claim 1,
wherein the hardware processor assigns the participatory role to each of the participants based on that the head movements of current speakers near ends of utterances are different between cases in a speaker continuation and in a speaker change.

5. The communication skill evaluation system as in claim 1,
wherein the hardware processor assigns the participatory role to each of the participants based on that the head movements near ends of utterances are different between a case in which the non-speaker becomes the next speaker and a case in which he/she does not.

6. The communication skill evaluation system as in claim 1,
wherein the hardware processor assigns the participatory role to each of the participants based on that amounts of change in head positions and a first rotation angle of the current speaker, wave amplitudes when changes in the head movements relating to the head positions and the first rotation angle are represented as waves, and wave frequencies when changes in the head movements in a second rotation angle are represented as waves become larger when there is a speaker change than when there is a speaker continuation.

7. The communication skill evaluation system as in claim 1,
wherein the hardware processor assigns the participatory role to each of the participants based on that a frequency of a head position of the current speaker becomes smaller when there is a speaker change than when there is a speaker continuation.

8. The communication skill evaluation system as in claim 1,
wherein the hardware processor assigns the participatory role to each of the participants based on that:
amounts of change and amplitudes of head positions and rotation angles are larger in non-speakers and the next speaker when there is a speaker change than those in the non-speakers when there is a speaker continuation; and
frequency of the head positions and the rotation angles are smaller in the non-speakers and the next speaker when there is the speaker change than those in the non-speakers when there is the speaker continuation.

9. The communication skill evaluation system as in claim 1
wherein the hardware processor assigns the participatory role to each of the participants based on that:
amounts of change in head positions are larger in the next speaker than those in non-speakers when there is a speaker change; and
a frequency in a head position is smaller in the next speaker than that in the non-speakers when there is the speaker change.

10. The communication skill evaluation system as in claim 1, wherein the hardware processor assigns the participatory role to each of the participants based on that, during a conversation, the non-speaker during a speaker continuation of a current speaker keeps his/her mouth closed, and the non-speaker during a speaker change of the current speaker keeps his/her mouth largely open.

11. The communication skill evaluation system as in claim 1,
wherein the hardware processor assigns the participatory role to each of the participants based on that the next speaker during a speaker change of the current speaker opens his/her mouth from a state in which his/her mouth is closed.

12. A communication skill evaluation device comprising:
a hardware processor that:
  detects, based on audio information of participants in a conversation, an utterance period defined by starting and ending times of each utterance in the conversation, and a participant who spoke in each detected utterance period;
  defines, as an utterance pair, two utterances obtained in chronological order from each detected utterance period;
  assigns, in accordance with whether or not each of the participants spoke in each defined utterance pair, a participatory role to each of the participants, the participatory role indicating that a participant is one of a current speaker who is speaking when the same speaker is continuing, a non-speaker who is not the current speaker when the same speaker is continuing, a current speaker who stops speaking when the speaker changes, a next speaker who speaks next when the speaker changes, and a non-speaker who is neither the current speaker nor the next speaker when the speaker changes;
  extracts, based on measurement results of non-verbal actions of each of the participants during the conversation, a non-verbal feature quantities for each of the participants, relating to the non-verbal actions at the end of the utterance in each detected utterance period; and
  estimates communication skill for each of the participants using a trained model and based on a combination, in each detected utterance period, of a predetermined non-verbal feature quantities of the assigned participatory role and the extracted non-verbal feature quantities,
  wherein the non-verbal actions are gaze actions, head movements, respiratory movements and mouth shape changes,
  where the model is trained using feature quantities for the non-verbal actions and, when the feature quantities cannot be acquired, the model is trained using prescribed values for the feature quantities, such that the prescribed values are derived from training data and are one of a median, a mode value, a mean value or a minimum value of a given feature quantity in the training data.

13. The communication skill evaluation device as in claim 12,
  wherein the hardware processor estimates, based on the measurement result of the non-verbal action, a next-speaker probability that each of the participants will speak next each time when an utterance ends during the conversation, and
  wherein the hardware processor computes, as the non-verbal feature quantity relating to the non-verbal action, a value of a skill determination parameter quantitatively indicating the communication skill of each one of the participants, based on the next-speaker probability of the one of the participants when the one of the participants spoke or when the one of the participants did not speak during the conversation.

14. The communication skill evaluation device as in claim 12,
  wherein the hardware processor extracts a verbal feature quantity indicating a verbal feature of the utterance in each detected utterance period, and
  wherein the hardware processor estimates communication skill for each of the participants based on a combination, in each detected utterance period, of the extracted verbal feature quantity, the assigned participatory role, and the extracted non-verbal feature quantity.

15. A non-transitory computer-readable medium having computer executable instructions that, upon execution of the instructions by a processor of a computer, cause the computer to function as the communication skill evaluation device according to claim 12.

16. A communication skill evaluation method comprising:
  detecting, based on audio information of participants in a conversation, an utterance period defined by starting and ending times of each utterance in the conversation, and a participant who spoke in each detected utterance period;
  defining, as an utterance pair, two utterances obtained in chronological order from each detected utterance period;
  assigning, in accordance with whether or not each of the participants spoke in each defined utterance pair, a participatory role to each of the participants, the participatory role indicating that a participant is one of a current speaker who is speaking when the same speaker is continuing, a non-speaker who is not the current speaker when the same speaker is continuing, a current speaker who stops speaking when the speaker changes, a next speaker who speaks next when the speaker changes, and a non-speaker who is neither the current speaker nor the next speaker when the speaker changes;
  extracting, based on measurement results of non-verbal actions of each of the participants during the conversation, non-verbal feature quantities for each of the participants, relating to the non-verbal actions at the end of the utterance in each detected utterance period; and
  estimating communication skill for each of the participants using a trained model and based on a combination, in each detected utterance period, of a predetermined non-verbal feature quantities of the assigned participatory role and the extracted non-verbal feature quantities,
  wherein the non-verbal actions are gaze actions, head movements, respiratory movements and mouth shape changes,
  where the model is trained using feature quantities for the non-verbal actions and, when the feature quantities cannot be acquired, the model is trained using prescribed values for the feature quantities, such that the prescribed values are derived from training data and are one of a median, a mode value, a mean value or a minimum value of a given feature quantity in the training data.

* * * * *